US007329866B2

(12) United States Patent
Wang

(10) Patent No.: US 7,329,866 B2
(45) Date of Patent: Feb. 12, 2008

(54) TWO-DIMENSIONAL ION TRAP MASS SPECTROMETRY

(76) Inventor: Yang Wang, 7 Black Bear La., Westford, MA (US) 01886

( * ) Notice: Subject to any disclaimer, the term of this patent is extended or adjusted under 35 U.S.C. 154(b) by 41 days.

(21) Appl. No.: 11/188,930

(22) Filed: Jul. 25, 2005

(65) Prior Publication Data

US 2005/0279932 A1 Dec. 22, 2005

(51) Int. Cl.
*B01D 59/44* (2006.01)

(52) U.S. Cl. ....................... 250/290; 250/292; 250/294

(58) Field of Classification Search ................ 250/290, 250/292, 294

See application file for complete search history.

(56) References Cited

U.S. PATENT DOCUMENTS

| | | | | |
|---|---|---|---|---|
| 2,939,952 | A | 6/1960 | Paul et al. | |
| 3,065,640 | A | 11/1962 | Langmuir et al. | |
| 3,527,939 | A | 9/1970 | Dawson et al. | |
| 4,540,884 | A | 9/1985 | Stafford et al. | |
| 5,028,777 | A | 7/1991 | Franzen et al. | |
| RE34,000 | E | 7/1992 | Syka et al. | |
| 5,420,425 | A | 5/1995 | Bier et al. | |
| 5,468,958 | A | 11/1995 | Franzen et al. | |
| 5,783,824 | A | 7/1998 | Baba et al. | |
| 6,403,955 | B1 | 6/2002 | Senko | |
| 6,844,547 | B2 * | 1/2005 | Syka | 250/292 |
| 6,911,650 | B1 * | 6/2005 | Park | 250/292 |
| 6,998,610 | B2 * | 2/2006 | Wang | 250/290 |
| 7,019,289 | B2 * | 3/2006 | Wang | 250/290 |
| 7,034,293 | B2 * | 4/2006 | Wells | 250/292 |

OTHER PUBLICATIONS

Qadrupole Mass Spectrometry and its Applications, edited by P.H. Dawson, published by Elsevier, 1976.

R. E. March and R.J. Hughes, "Quadrupole Storage Mass Spectrometry", John Wiley & Sons, New York, 1984.

Practical Aspects of Ion trap Mass Spectrometry, vol. I, II, III , edited by R. E. March,John F. J. Todd, CRC Press, Boca Raton , New York, London, Tokyo , 1995.

E.C. Beaty , "Simple electrodes for quadrupole ion trap", J. of Applied Physics, 61, (1987) 2118-2122.

Yang Wang, et. al, "The non-linear Resonance Ion trap, part 2 : A general theoretical analysis", International Journal of Mass Spectrometry and Ion processes , 124 , (1993) 125-144.

R. Alhezt, et al, "High order non-linear Resonances In a paul Trap", International Journal of Mass Spectrometry and Ion processes, 154, (1996) 155-169.

* cited by examiner

*Primary Examiner*—David Vanore

(57) ABSTRACT

A two-dimensional ion trap comprises a first and second trapping plate located in a first and second terminals of the ion trap device, a set of four predetermined surface-shaped rods located in the center, a set of electrodes located between the set of four predetermined surface-shaped rods, and a control circuitry for applying a predetermined voltage to said first and second trapping plates.

8 Claims, 16 Drawing Sheets

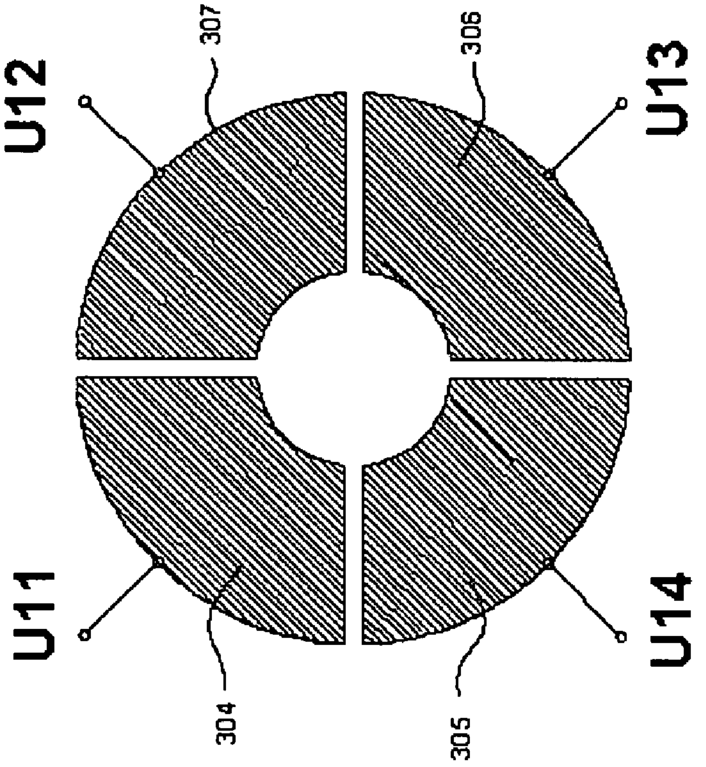
FIG. 10b
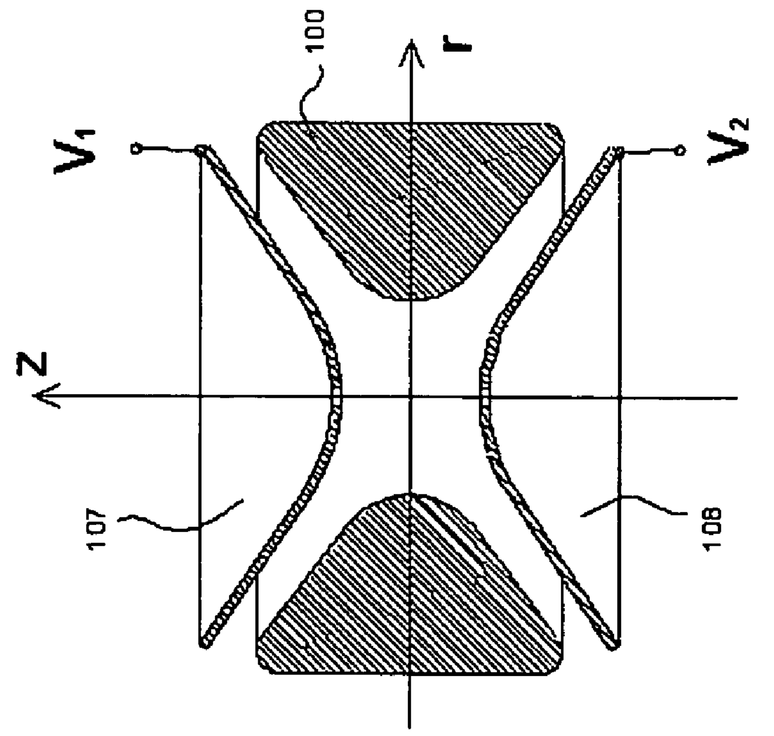
FIG. 10a
FIG. 10

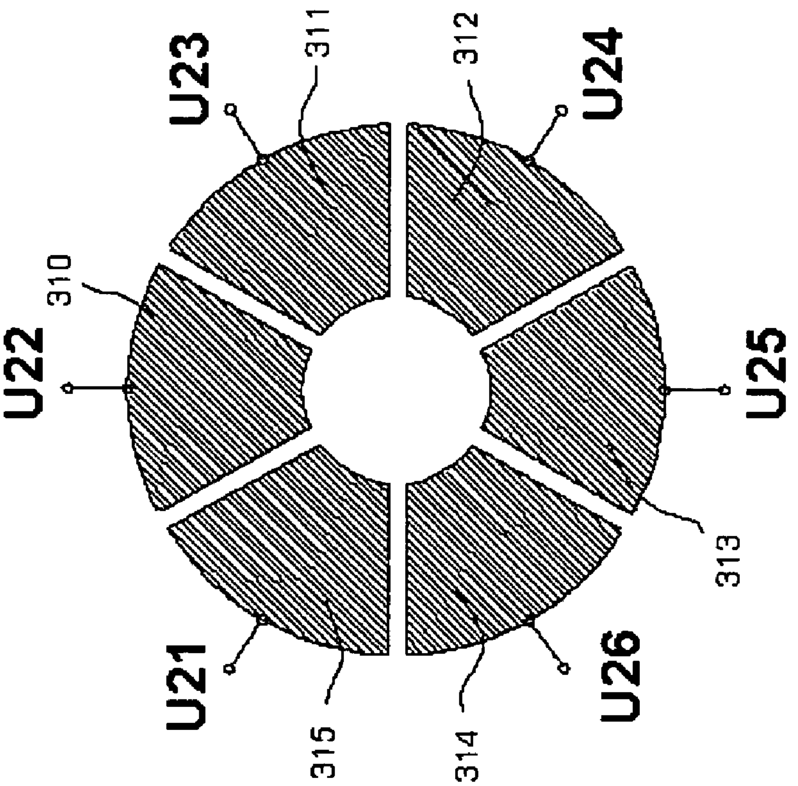
FIG. 11b
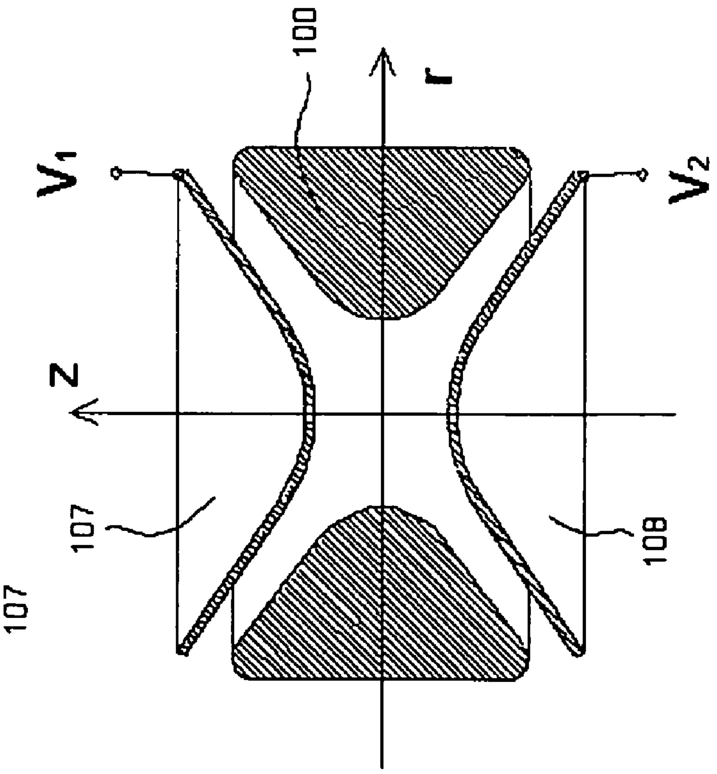
FIG. 11a
FIG. 11

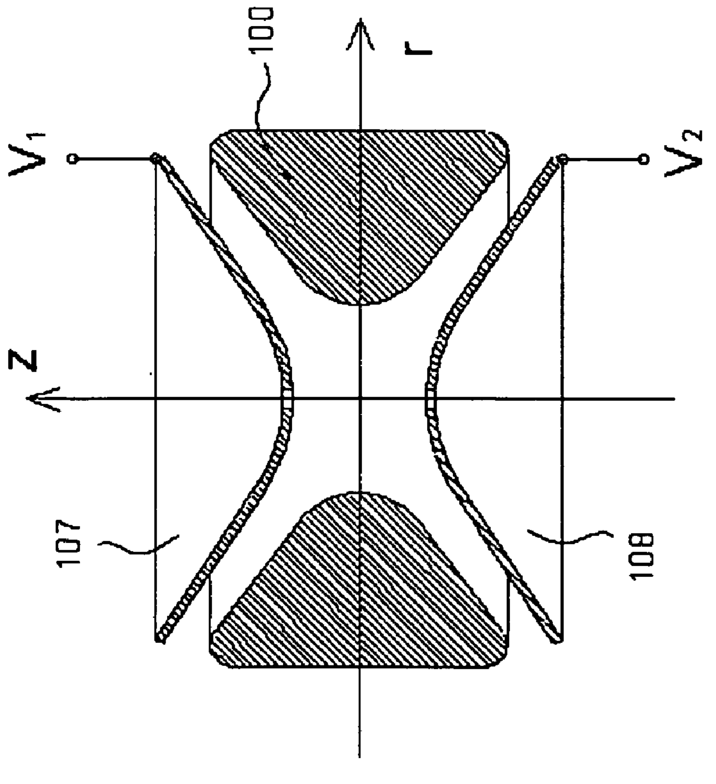
FIG. 12a
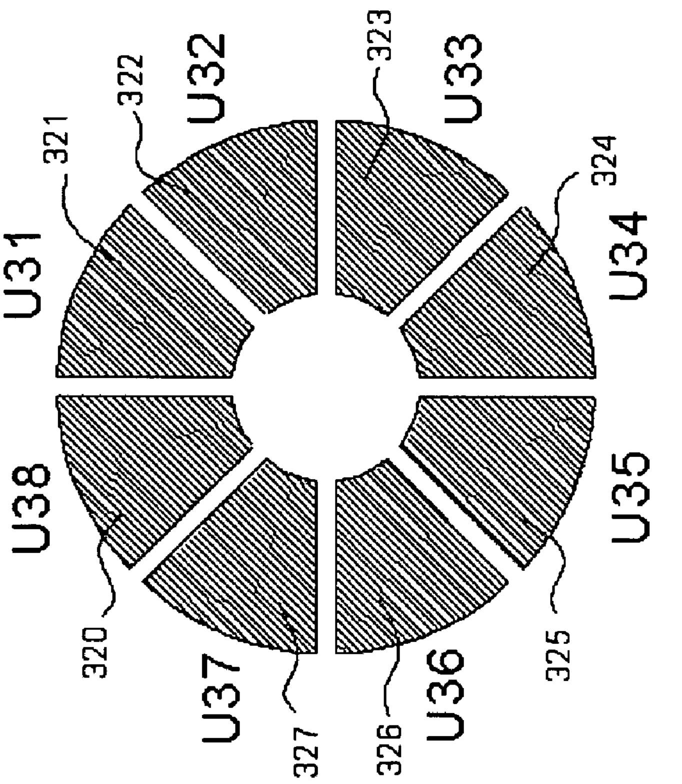
FIG. 12b
FIG. 12

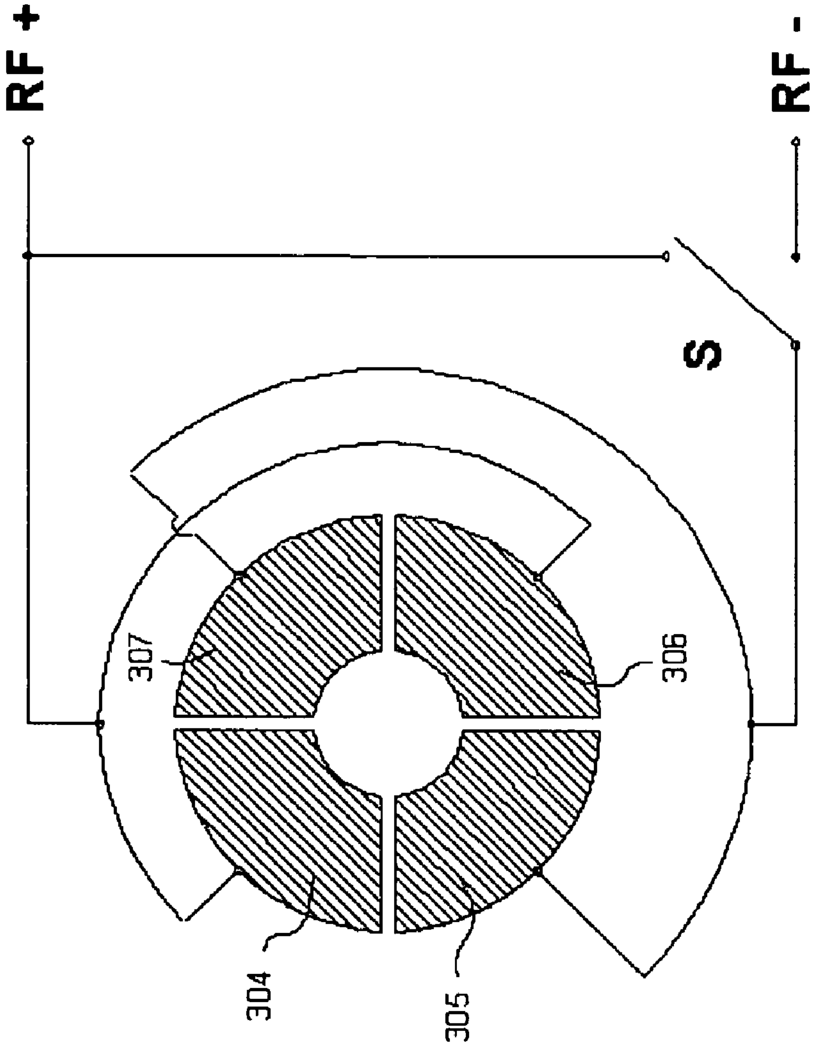
FIG. 13b
FIG. 13
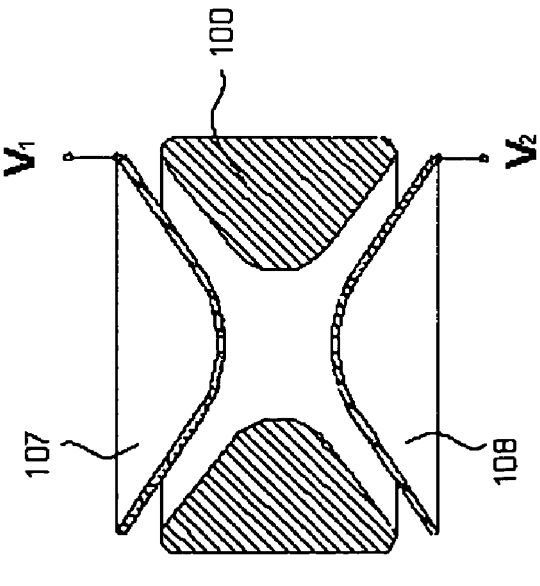
FIG. 13a

TWO-DIMENSIONAL ION TRAP MASS SPECTROMETRY

CROSS REFERENCE TO RELATED APPLICATIONS

This application incorporates by reference and claims priority of application Ser. No. 10/764,252 of Yang Wang entitled ION TRAP MASS SPECTROMETRY filed Jan. 23, 2004 which further claims priority under 35 U.S.C. §119(e) to provisional patent application No. 60/443,900, filed Jan. 31, 2003, the disclosure of which is hereby incorporated by reference herein.

STATEMENT REGARDING FEDERALLY SPONSORED RESEARCH

Not Applicable.

FIELD OF THE INVENTION

The present invention relates generally to mass spectrometry and more particularly to apparatus and methods using three-dimensional or two-dimensional RF quadrupole ion trap with superpositions of independent electrically variable electrostatic multipoles.

BACKGROUND OF THE INVENTION

The mass spectrometer is a known instrument for measuring the gas-phase mass ions or molecular ions in a vacuum chamber via ionizing the gas molecules and measuring the mass-to-charge ratio of the ions. One specific type of mass spectrometer is the ion trap mass spectrometer. The quadrupole ion trap was first described in U.S. Pat. No. 2,939,952 by Paul and H. Steinwedel, where the disclosed ion trap is composed of a ring electrode and a pair of opposite end cap electrodes. The inner surfaces of the ring and two end cap electrodes are rotationally symmetric hyperboloids.

The quadrupole ion trap and another type of mass spectrometer—the quadrupole mass filter both utilize the stability or instability of ion trajectories in a dynamical electric field to separate ions according to ions' mass-to-charge ratios-m/Q. As is known in the art, the ion movement inside the quadrupole field can be derived from Mathieu equation. Stability diagram is utilized to determine an ion's stable or instable movement in the quadrupole field. Theories and applications of quadupole mass filter and quadrupole ion trap are described in numerous literatures such as "Quadrupole Mass Spectrometry", edited by P. H. Dawson, Elsevier, Amsterdam, 1976; "Quadrupole Storage Mass Spectrometry", by R. E. March and R. J. Hughes, John Wiley & Sons, New York, 1989; "Practical Aspects of Ion Trap Mass Spectrometry", Volumes I, II and III edited by R. E. March and John F. J. Todd, CRC Press, Boca Raton, New York, London, Tokyo, 1995, to name a few.

In cylindrical coordinates (r, z) (since the field is rotationally symmetric), an ideal or pure three-dimensional quadrupole potential distribution $\Phi_q$ is expressed as $$\Phi_q=\Phi_0/R_0^2*(r^2-2*z^2) \quad (1)$$

where $R_0$ is a parameter of length dimension. $\Phi_0$ is a position-independent factor which is time dependent. The hyperboloid metallic electrode surfaces of Paul trap is shaped by equipotential surfaces of equation (1) with $$\Phi_q=+1 \text{ and } -1;\ \Phi_0=1;\ \text{and } R_0=r_0;$$

where $r_0$ is the distance from the center of the trap to apex of the ring electrode. The distance between apexes of two opposite caps is $2*z_0$. When an RF (radio frequency) voltage having magnitude V and frequency Ω, and a DC (direct current) voltage having magnitude U are applied to the ring electrode where two caps are grounded, ions can be trapped in the generated RF electric quadrupole field. It is well-known that the movement of an ion having mass m and electric charge Q inside an ideal RF quadrupole field can be derived from the following Mathieu equation:

$$d^2u/d\xi^2+(a_u-2*q_u*\cos(2*\xi))*u=0 \quad (2)$$

Where u=r, z; $\xi=\Omega*t/2$; $a_u=-8*e*U/(m*r_0^2*\Omega^2)$; $q_u=4*e*V/(m*r_0^2*\Omega^2)$.

The Mathieu equation (2) can be solved using analytical methods. The fundamental properties of the ion movement are as follows:

1. The ion movement in the axial or z direction is completely decoupled from the movement in the direction perpendicular to the z-axis, normally called the r direction.
2. The RF field intensity is linear in the r and z directions of the cylindrical coordinates and has only one parameter describing the periodicity.
3. The stability of ions of a given mass-to-charge ratio in an infinitely large quadrupole field does not depend on the initial movement conditions of the ions, it depends on the field parameters.
4. Only the two "mass-related amplitude parameters" $a_u$ for DC field and $q_u$ for RF field determine whether the oscillation amplitude of the ions will increase to infinity without limit. This is described by the well known "stability diagram" for quadrupole ion traps.
5. If the set of parameters ($a_u$, $q_u$) is kept inside the stability region of the stability diagram, the ions will perform stable oscillation in the r and z directions at certain frequencies—the so-called secular frequencies. The fundamental secular frequency is $\frac{1}{2}*\beta_u*\Omega$ and the parameter $\beta_u$ is a value dependent on the parameters $a_u$, $q_u$. The iso-$\beta_r$, and iso-$\beta_z$ lines subdivide the stability region.
6. The frequencies of the secular oscillation are independent of the ion oscillation's amplitude.

A mass spectrum can be obtained by the so-called mass scanning method in an ion trap mass spectrometer. Dawson and Whetten in U.S. Pat. No. 3,527,939 described a "mass-selective storage" method. The method is based on the same quadrupole mass filter operating principle, namely only ions with a particular mass-to-charge ratio m/Q possess stable movement trajectories and are selectively stored in the trap along with a set of parameters ($a_u$, $q_u$) which lie in the apex of the first stability region of the stability diagram. The ions are extracted to detector by a pulse on an end cap electrode after certain time period. A mass spectrum is obtained by swapping or scanning slowly DC and RF voltages at constant U/V. Ions of different mass-to-charge ratios are ejected through one or a plurality of holes on the center of an end cap and are detected by an ion detector, such as a secondary electron multiplier, sequentially or one mass-to-charge-ratio ion after the other.

Stafford, Kelley and Stephens described another mass scanning method "mass-selective instability" in U.S. Pat.

No. 4,548,884, where only RF voltage is applied to ring electrode and ions with a range of different mass-to-charge ratios are trapped. The RF voltage is swept increasingly with time. When the related parameter $q_z$ approaches the boundary of the first stability region (e.g., $a_z$=0, $q_z$=0.908), oscillations of the ions of a particular m/Q, with that parameter, will be unstable in z direction and be ejected. A mass spectrum is obtained by scanning RF voltage and detecting the unstable ions of different m/Q sequentially.

Another mass scanning method of obtaining a mass spectrum is the mass-selective resonance ejection method described by Syka, Louris, Kelley, Stafford and Reynolds in U.S. Pat. Re 34,000. The method employs an auxiliary AC (alternating current) voltage which is applied between the caps. When the RF voltage is swept increasingly with time, the oscillating secular frequency of trapped ions of a particular m/Q will increase correspondingly. When the frequency of the AC voltage coincides with the secular frequency of the ions, the ions will be oscillated in resonance and be ejected eventually. The resonance is linear because the amplitude of the oscillation is independent of the frequency according to Mathieu equation (1). The method also is utilized in a linear two-dimensional quadrupole ion trap described by Bier et al, in U.S. Pat. No. 5,420,425.

All above mentioned ion traps used the conventional Paul's trap structure with two caps and one ring. They are generally operated in a high or medium high vacuum condition. However, if the ion traps are operated in a lower vacuum, the linear resonance frequency curve will be broadened due to massive collision between ion and neutral gas, which will cause the mass resolving power to decrease dramatically.

Another issue is that, even with precisely shaped trap-electrodes, the field inside the practical Paul ion traps demonstrates unavoidable deviates from the ideal quadrupole field due to a wide variety of factors such as the truncation to finite size, holes on the caps if no special corrections are applied etc. Deviation of electrode shapes from pure quadrupole systems result in the superposition of higher multipole fields, like hexapole, octopole onto the quadrupole field. These non-linear components of the field may be introduced either from electrode faults or by deliberate superposition.

The general potential distribution Φ having rotational symmetry within a boundary is expressed in spherical coordinates (ρ,θ) as follows:

$$\Phi(\rho,\theta)=\Phi_0*\Sigma(A_n*\rho^n/r_0^n*P_n(\cos\theta)) \quad (3)$$

where n is integers from zero to infinity, Σ is the sum, $A_n$ are weight factors which are determined from the boundary condition of the trap, $P_n(\cos\theta)$ are Legendre polynomials of order n. In ion trap mass spectrometer, Φ is a position-independent but time-dependent quantity representing the strength of the potential, $\Phi_0=\Phi_0(t)$. Because $\Phi_0$ is time-dependent, the potential including higher multipoles is a dynamic or time-dependant potential and corresponding field is a time-dependant field. A ideal three-dimensional quadrupole field $\Phi_q$ is described by n=2 and $A_2$=−2 ($A_n$=0 if n is not equal to 2) in Eq. (3):

$$\Phi_q=-2*\Phi_0/r_0^2*\rho^2*P_2(\cos\theta))=\Phi_0/r_0^2*(r^2-2*z^2) \quad (4)$$

which is the same as Eq. (1). The different terms of the sum in Eq. (3) constitute the "multipole components" of the potential distribution. A few of exemplary lowest multipoles are:

n=3 (hexapole):

$$\Phi_h=A_3*\Phi_0/r_0^3*\rho^3*P_3(\cos\theta))=A_3*\Phi_0/r_0^3*(2*z^3-3*z*r^2)/2 \quad (5)$$

n=4 (octopole):

$$\begin{aligned}\Phi_0 &= A_4*\Phi_0/r_0^4*\rho^4*P_4*(\cos\theta)) \quad (6)\\ &= A_4*\Phi_0/r_0^4*(8*z^4-24*z^2*r^2+3*r^4)/8\end{aligned}$$

n=5 (decapole):

$$\begin{aligned}\Phi_{de} &= A_5*\Phi_0/r_0^5*\rho^5*P_5(\cos\theta)) \quad (7)\\ &= A_5*\Phi_0/r_0^5*(8*z^5-40*z^3*r^2+15*z*r^4)/8\end{aligned}$$

n=6 (dodecapole):

$$\begin{aligned}\Phi_{do} &= A_6*\Phi_0/r_0^6*\rho^6*P_6(\cos\theta)) \quad (8)\\ &= A_6*\Phi_0/r_0^6*\\ &\quad (16*z^6-120*z^4*r^2+90*z^2*r^4-5*r^6)/16\end{aligned}$$

If n=1 ($A_n$=0 for n≠1), it is dipole potential:

$$\Phi_d=A_1*\Phi_0/r_0*\rho*P_1(\cos\theta))=A_1*\Phi_0/r_0*z \quad (9)$$

where $A_1$, $A_2$, $A_3$, $A_4$, $A_5$ and $A_6$ are weight factors of the corresponding filed components, which are determined from the boundary condition or the tape structure. For example, for hyperboloid boundary with infinitively-length, which corresponds to that the weight factor $A_2$ equals to −2 ($A_n$=0 if n is not equal to 2), the ideal or pure quadrupole will be obtained.

SUMMARY OF THE INVENTION

In general, in one aspect, the invention features a two-dimensional ion trap which comprises a first and second trapping plate located in a first and second terminals of the ion trap device, a set of four predetermined surface-shaped rods located in the center, a set of electrodes located between the set of four predetermined surface-shaped rods, and a control circuitry for applying a predetermined voltage to said first and second trapping plates.

Implementations of the invention may include one or more of the following features. The ion trap further comprises a set of short quadrupole rods located between the predetermined surface-shaped rods and the first and second trapping plates. The set of electrodes of the ion trap may be composed of a set of four smaller diameter's cylindrical rods, or a set of four slice electrodes. The ion trap further comprises a RF circuitry constructed and arranged for applying a RF voltage to said set of four predetermined surface shaped rods to generate a main two dimensional quadrupole field, an AC offset circuitry constructed and arranged for applying an AC voltage to a pair of said set of four predetermined surface shaped rods to generate a main dipole field, a DC circuitry constructed and arranged for applying a DC voltage to said set of electrodes to superimposes a two dimensional electrically variable electrodes octopole field within the two dimensional quadrupole field. The predetermined surface-shape of the ion trap may be quadrupole surface-shaped. A tandem mass spectrometers which comprises a collision cell to perform mass fragment, the collision cell has the structure of the ion trap. A method of operating the ion trap comprises keeping amplitude and frequency of the RF voltage or amplitude and period of the periodic voltage at predetermined values, simultaneously sweeping or scanning the amplitude of the DC voltage and the amplitude and frequency of the AC voltage vs. time to eject ion mass from the ion trap one after another. A method of operating the ion trap comprises keeping the frequency of the RF voltage or the period of the periodic voltage and the frequency of the AC voltage at predetermined values, simultaneously sweeping or scanning the amplitudes of the RF voltage or the periodic voltage, the AC voltage and the DC voltage vs the time to eject ion mass from the trap one after another. A method of operating the ion trap comprises setting the frequency of the AC voltage to zero, setting the amplitude of the AC voltage to be different from the amplitude of the DC voltage or zero, keeping the frequency of the RF voltage or the period of the periodic voltage at predetermined value; simultaneously sweeping or scanning the amplitudes of the RF voltage and DC voltage vs. time to eject ion mass from the trap one after another. An ion trap system comprises the ion trap, and the ion trap being sealed within a vacuum chamber pumped by a vacuum pump to provide gas pressure in the ion trap. In the ion trap system, the vacuum chamber having vacuum in the range between $10^{-2}$ to $10^{-1}$ mbar. In the ion trap system, the DC circuitry being constructed and arranged for applying an DC voltage to adjust the intensity of the electrically variable electrostatic octopole field in the ion trap to optimize the mass resolving power when the gas pressure is higher. A method for providing ions into ion trap system comprises introducing gas-phase molecules through a membrane into an ionization area; ionizing said gas-phase molecules by a radioactive Ni beta source or multi-photon ionization of laser.

In another aspect, the invention features a two-dimensional ion trap which comprises a first means for generating a time-varying, two-dimensional substantially quadrupole field, a second means for generating an independent dipole field; a third means for superimposing an independent, two-dimensional electrically variable electrostatic multipole field.

In further another aspect, the invention features a mass spectrometer which comprises an ionization source for generating mass ions; a linear ion guide for accumulating and transferring the ions; at least two two-dimensional quadrupole linear ion traps series connected to each other for receiving and processing the transferred irons.

Implementations of the invention may include one or more of the following features. The mass spectrometer further comprises a time-of-flight (TOF). The mass spectrometer further comprises a lens system for trapping ions in axial direction. he mass spectrometer further comprises collision gas in the linear ion guide for cooling the ions and performing collision induced dissociation (CID) process. In the mass spectrometer, the processing comprises performing MS/MS processes in serial for the ions between the at least two two-dimensional quadrupole linear ion traps. In the mass spectrometer, the processing comprises performing MS/MS in serial for the ions between the at least two two-dimensional quadrupole linear ion traps, and the time-of-flight (TOF) measuring fragment ions of the MS/MS processes. In the mass spectrometer, each of the at least two linear ion traps comprises a set of rods by which a DC voltage can be applied to generate DC octopole field. In the mass spectrometer of claim, each of the at least two linear ion traps comprises a set of slice electrodes by which a DC voltage can be applied to generate DC octopole field. In the mass spectrometer, each of the at least two linear ion traps electrode has hyperbolic curve surface. In the mass spectrometer, each of the at least two linear ion traps electrode has cylindrical curve surface. In the mass spectrometer, each of the two terminals of each of the at least two linear ion traps comprises a set of short quadrupole rods. In the mass spectrometer, each of the two terminals of each of the at least two linear ion traps comprises a lens system.

Other features, aspects, and advantages of the invention will become apparent from the description, the drawings, and the claims.

BRIEF DESCRIPTION OF THE DRAWINGS

The invention will be more fully understood from the following detailed description taken in conjunction with the accompanying drawings, in which:

FIG. 10*a* is a cross-sectional view of the three-dimensional, rotationally symmetric ion trap with the ring electrode 100 and the hyperbolic two cap electrodes 107 and 108 with the same structure as those shown in FIG. 1 and FIG. 3.

FIG. 10*b* is the top view of the ring electrode of FIG. 10*a*. The ring electrode 100 is equally cut into four sub-divided electrodes 304, 305, 306 and 307.

FIG. 11*a* is a cross-sectional view of the three-dimensional, rotationally symmetric ion trap with the ring electrode 100 and two hyperbolic cap electrodes 107 and 108 with the same structure as those shown in FIG. 1 and FIG. 3.

FIG. 11*b* is the top view of the ring electrode of FIG. 11*a*. The ring electrode is equally cut into six sub-divided elecctrodes 310, 311, 312, 313, 314 and 315.

FIG. 12*a* is a cross-sectional view of the three-dimensional, rotationally symmetric ion trap with the ring electrode 100 and hyperbolic two-cap electrodes, 107 and 108 with the same structure as those shown in FIG. 1 and FIG. 3.

FIG. 12*b* is the top view of the ring electrode of FIG. 12*a*. The ring electrode is equally cut into eight sub-divided electrodes 321, 322, 323, 324, 325, 326 and 327.

FIG. 13 is an example of a RF voltage supply circuit sketch for the ring electrode shown in FIG. 10.

DETAILED DESCRIPTION OF THE INVENTION

Figure 1:
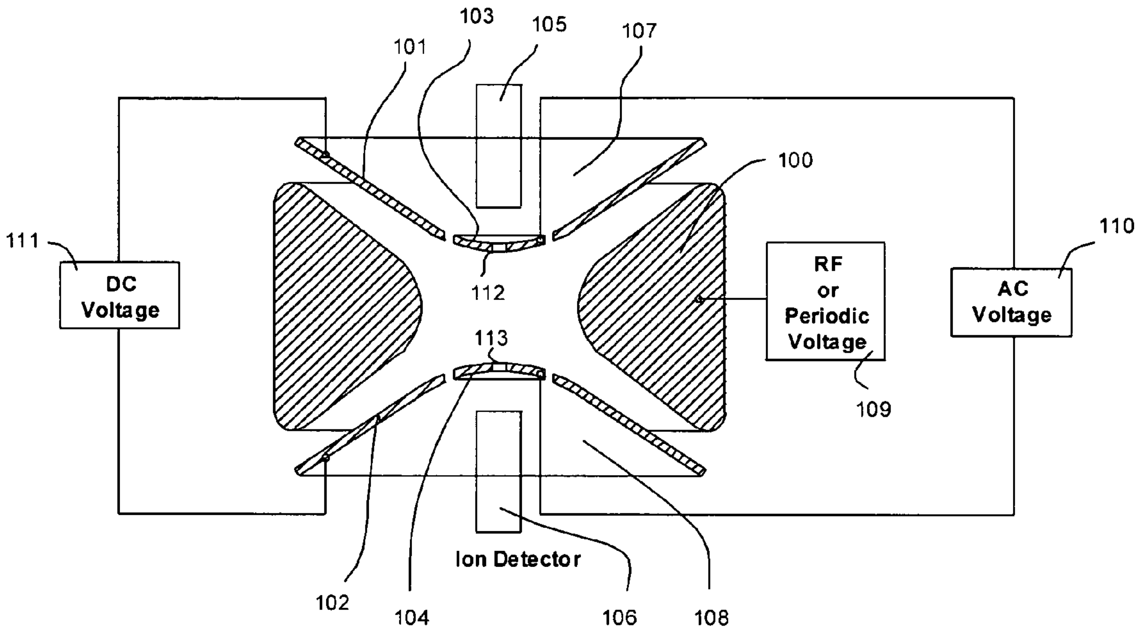
FIG. 1 is a cross-sectional view of a three-dimensional, rotationally symmetric quadrupole ion trap in accordance with the invention.

Deviation of electrode shapes from ideal quadrupole systems result in the superposition of higher non-linear multipole fields, such as hexapole and octopole, onto the quadrupole field. Langmuir et al, described a cylindrical ion trap in U.S. Pat. No. 3,065,640. Beaty considered a geometry in which the ring and end-cap electrodes have conical boundaries in a cross-sectional view of the trap (E. C. Beaty, "Simple electrodes for quadrupole ion traps", J. Appl. Phys., 61, (1987), 2118-2122). Those geometries are deviated a little too far from the electrode shapes of the ideal quadrupole ion trap. It results in the superposition of multiple fields with higher weight factors. The multipoles with the higher weight factors which are not controlled cause the complexity of the non-linear effects in ion traps. Furthermore, the non-linear multipoles fields are introduced via deliberate superposition to achieve higher performances of the mass spectrometers. The non-linearity, caused by the multipole fields, changes the ion motion which could otherwise be predictable for the pure quadrupole field. If weak multipole fields (like hexapole, octopole, decapole, dodecapole and higher order fields) are superinposed, the resulting non-linear ion traps will exhibit following effects which differ considerably from those of ideal quadrupole ion trap:

1. The RF field is non-linear in the r and z directions of the linear trap.
2. For multipoles higher than or equal to hexapoles, the secular frequencies are no longer constant for constant field parameters: they become amplitude dependent.
3. The ion motions in the r and z directions are no longer independent: they are coupled.
4. Several types of non-linear resonance conditions exist for each type of multipole superposition, forming resonance lines within the stability region of the stability diagram.
5. The ions with non-linear resonances do not always exhibit instability. They may take up energy from the driving RF field and thus increase their secular oscillation amplitude. Because of the amplitude-dependence of the secular frequency, the frequency now drifts out of resonance, reacts in a kind beat. The maximum amplitude of the secular oscillation, therefore, is dependent on the initial conditions (location and speed) of the ions at the beginning of the resonance.

In general, the quadrupole ion trap with the delicate superposition of higher multipoles utilizes the RF multipole field. Also, weight factors of multipoles are fixed by shaped electrode surfaces or structure deviation of Paul's trap. The ratio of the strength of multipole to quadrupole can not be varied electrically and independently. Such non-linear ion trap has been described by Franzen et al, in U.S. Pat. No. 4,975,577; U.S. Pat. No. 5,028,77 and U.S. Pat. No. 5,170,054. It should be pointed out that this type of ion traps still use the conventional Paul's trap structure with two caps and one ring, but with the modified, shaped surfaces only. In aforementioned patents, only special non-linear resonance lines in the stability diagram (for example, $\beta_z=2/3$) caused by the superposition of RF multipoles, are applied in a mass scanning method to analyze mass ions.

As mentioned above, non-linear quadrupole systems are characterized by the superposition of weak non-linear fields (higher multipole fields) on the main quadrupole field. The non-linearity is largely caused by deviations of electrodes from the pure hyperbolic shapes. The non-linearity results in resonances which must fulfill appropriate conditions. General non-linear resonance conditions for a time-variable or RF, three-dimensional, non-linear quadrupole system are derived by Wang et al ("The non-linear resonance ion trap, Part 2, A general theoretical analysis", Int. J. Mass Spectrom. and Ion Proc. 124, (1993), 125-144). The occurrence of resonances depends on the electrode shapes of the non-linear quadrupole systems which control the weight factors of the higher RF multipole fields. Each resonance condition can be described by resonance lines within the stable regions of the stability diagram. Such special resonance lines have been applied in a mass scanning method described by Franzen et al, in U.S. Pat. No. 4,975,577. Franzen and Wang described a quadrupole ion trap with switchable multipole fractions in U.S. Pat. No. 5,468,958, but the multipoles are RF based. The multipole is generated by "appliying a second RF voltages', but neither electrostatic multipole nor independent multipole is introduced. Quadrupole ion traps with superposition of non-linear RF multipoles may cause many theoretical and practical problems, for example, complexes non-linear resonances and ion losses. The experimental results have been partially described by Alheit et al ("Higher order non-linear resonances in a Paul trap", Int. J. Mass Spectrom. and Ion Proc. 154, (1996), 155-169).

Senko described a linear ion trap with a multi-electrode structure in U.S. Pat. No. 6,403,955 B1. However, the elements located between the linear rods are used to detect the image currents produced by motion ions in the trap. Baba et al. described another linear ion trap with two sets of elements located between the linear rods in U.S. Pat. No. 5,783,824. The shaped elements was used to generate a trapping field in axial direction.

The ion trap, in accordance with the present invention as shown in FIG. 1, is both an ion storage element and an ion-mass analyzer. It is a multi-electrode's ion trap with electrostatic multipoles. The ion trap consists of a three-dimensional, rotationally symmetric ring electrode 100 and two-cap electrodes 107 and 108 with hyperbolic surfaces facing toward the inside of the trap. Each cap is cut into two portions, hyperbolic cone electrodes 101 and 102 and hyperbolic disk electrodes 103 and 104. The gap between the cone and disk should be made as small as practically possible as long as cone and disk are isolated from each other. Each disk has a central hole or a plurality of small holes 112 and 113 (not shown) for ion entrance or exit. The ion trap is gas-sealed in a vacuum chamber (not shown). The typical vacuum is about a few $10^{-3}$ mbar. Specifically, the ion trap according to the invention can be operated in a lower vacuum of $10^{-2}$ to $10^{-1}$ mbar pumped by a low vacuum pump.

The operation of the ion trap has three main steps: ion generation, ion storage or trapping and ion mass analysis.

Ions can be generated inside the trap, for example, by electric optic systems 105 which can further include an electron beam and laser photon ionization. Also, ions can be generated outside the trap, for example, by electrospray ionization (ESI), or Matrix-Assisted Laser Desorption Ionization (MALDI), or radioactive $^{63}Ni$ beta source and are transferred by electric optic system 105 into the inside of the ion trap.

For ion storage or trapping, the ring electrode 100 is supplied with either an radio frequency (RF) voltage at an appropriate amplitude V with frequency Ω, or a periodic voltage pulse with amplitude $U_p$ and period T. For storage, the disk electrodes 103, 104 and the cone electrodes 101, 102 are either grounded or are supplied with low DC voltages. Inside the ion trap, a time-varying, substantially pure quadrupole field is generated. The low DC voltage 111 is used to compensate quadrupole field distortion which may result from a variety of factors such as the hole on the center of the disk, the gaps between the disk and cone electrodes; and the fact that the theoretical infinite electrodes are practically cut to limited sizes and some machining and assembling tolerances of trap surfaces The substantially pure quadrupole field can trap a broad range of ion masses of different mass-to-charge ratios.

A variety of ion mass analysis methods can be performed based on three electric fields: a main quadrupole RF field, a main AC dipole field and an electrostatic (DC) multipole field. Three methods will be described as follows in accordance with the present invention.

For the first method, as shown in FIG. 1, an RF or a periodic voltage is applied to the ring electrode 100; an AC voltage with amplitude $V_d$ and frequency ω 110 is applied between two disks 103 and 104 with opposite polarity or with one cap grounded; and a DC voltage with amplitude $V_c$ 111 is applied to two cone electrodes 101 and 102. According to superimposition principle of the electric fields, three independent electric fields will be generated in the ion trap: a time-varying electric quadrupole field, a main time-varying dipole field and a main electrostatic octopole field. These three electric fields result from the independent and interactive operation of three power sources: RF or a periodic voltage applied to the ring electrode 100; AC voltage applied to two disks 103 and 104, and DC voltage applied to cone electrodes 101 and 102. For example, the electrostatic octopole is generated when the DC voltage $V_c$ is applied to two rotational cone electrodes 101 and 102, and when the RF or a periodic voltage applied to the ring electrode 100 has zero voltage, and when the AC voltage applied to the two disk electrodes 103 and 104 also has zero voltage.

Figure 2:
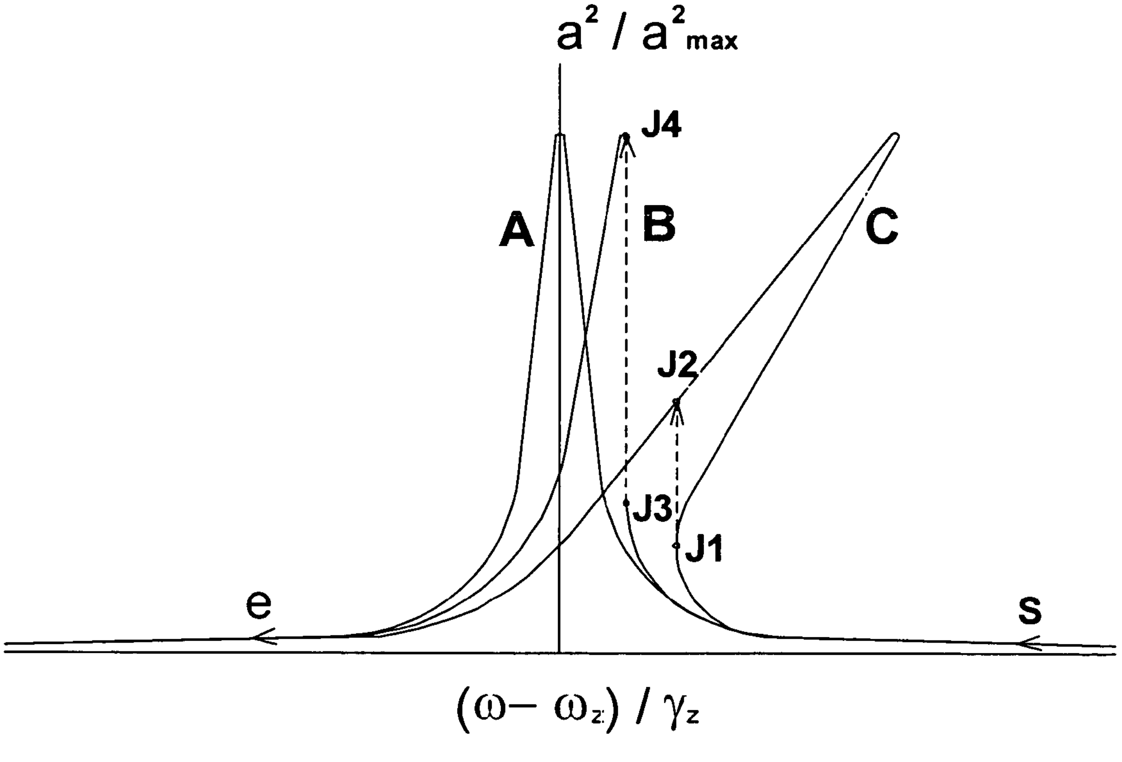
FIG. 2 illustrates the relationships between squared amplitudes a (in vertical axis) of non-linear oscillations of ions in the ion trap vs. the frequencies $\omega$ of the driving voltage AC and related damping constant $\gamma_z$ (in horizontal axis) for three different intensity of non-linearity, represented by A, B and C.

The quadrupole and dipole field can be generated similarly under different voltage combinations. As said, the three fields are independent of each other. By adjusting the amplitudes V (or Up), $V_d$, and $V_c$, the intensities of the corresponding fields can be changed, respectively. For the electrostatic electric octopole, its intensity is entirely dependent on the DC voltage $V_c$, which can be varied electrically. It is worth emphasizing that the octopole field is electrostatic, instead of a RF field. The ion motion in these fields is governed by the following equation:

$$d^2z/d\tau^2+\gamma_z dz/d\tau+\omega_z z+\alpha z^3=F\cos(\xi\tau).$$

Where z is the amplitude of the ion oscillation in cylindrical coordinates (r, z), τ is related time parameter, $\gamma_z$ is related damping parameter due to ion-neutral collision, $\omega_z$ is fundamental frequency of ion oscillation, α is intensity-related parameter of electrostatic octopole field and F is related intensity of the dipole field. This is a non-linear equation because of the non-linear nature of the electrostatic octopole field. The results from solving this equation are illustrated in FIG. 2 which shows the relationship of the amplitude of the ion oscillation vs. the frequency, damping parameter, and the voltage $V_c$ or the intensity of the electrostatic octopole field for three different states. In the FIG. 2, only the states for positive or zero value α are displayed, the corresponding mass scanning methods will be described in more details below. When α is a negative value, the picture will be similar; only in this case the resonance curve will be inclined to the side of small value of frequency (not shown). In this invention, α is variable and can be positive or negative. The octopole field can have polarity of positive ($A_4$ is larger than zero in Eq. 6) or negative ($A_4$ is smaller than zero in Eq. 6) and its intensity is variable, which are deferent from the methods disclosed in the prior art that only generate a fixed polarity value. In the following, the mass scanning methods for the scenario where α is larger than zero will be described; but it should not be posted as a limitation, the scenario where α is smaller than zero can be described in a similar fashion. State A shows the amplitude-frequency relationship or resonance curve of ion oscillation when the voltage $V_c$ is zero so there will be no electrostatic octopole field. As demonstrated, ions having a particular mass-to-charge ratio such as 100 Dalton undergo a linear resonance. State B shows the amplitude-frequency relationship of ion oscillation when the voltage $V_c$ or the intensity of the electrostatic octopole field is adjusted such that the ion oscillation has maximal amplitude. As shown, if the resonance is exited by starting at a high frequency point s and then gradually lowing the frequency, the amplitude of the response follows the resonance curve from right side to left side until point J3 is reached, at which point the amplitude of the ion oscillation discontinuously jumps to upper apex J4 of the curve. As the frequency is further decreased, the amplitude of the response follows continuously along the left branch to point e. So the ions of a particular mass undergo a non-linear resonance for state B in contrast to the linear resonance for state A. If the maximal amplitude is larger than the distance from the center to the end cap of the trap, the ions will be ejected out of the trap. Because ions of a particular mass undergo sharp jumping at point J3, the higher mass resolving power is thus obtained. The curve also shows the amplitude of the ion oscillation is dependent on its frequency, which is a characteristic of the non-linear resonance. It is worth mentioning that the direction of the frequency scanning is sole. When α is larger than zero, the jump occurs only when the frequency diminishes; no jump will occur when the frequency increases. In contrast, when α is smaller than zero, the jump occurs when the frequency increases. So the non-linear effect is used to improve resolving power of ion mass due to sharp jump of ion oscillation caused by the non-linear resonance, especially when the ion trap operates in a lower vacuum chamber. In the lower vacuum, the resonance curves for both states A and state B in FIG. 2 will be broadened due to the increased gas pressures. Without electrostatic octopole field (zero Vc), ion resonance will follow the broadened curve A, the mass resolving power will decrease accordingly. However, if ions undergo the non-linear resonance along curve B, the mass resolving power will not change compared to higher vacuum operation because the broadened resonance curve will not interfere the sharp jump of the ions. The resonance curve C corresponds to the scenario with higher voltage $V_c$ or higher intensity of the electrostatic octopole field. For state C, Ion undergoes the sharp jump at point J1 but may not be ejected out of the ion traps. As shown, too strong non-linear resonance (with higher Vc compared to sate B) will "damping" the amplitude of the resonance. It should be point out that resonant frequencies are not fraction ratio of RF frequency, or not a special resonance line which was described by Franzen et al, in U.S. Pat. No. 4,975,577.

In aforementioned ion mass analysis, the amplitude V and frequency Ω of the RF voltage is kept at an appropriate value, for example, 250 volt (zero to peak) and 1 MHz to trap ions with a broad range of mass-to charge ratios m/Q. When a periodic voltage is utilized instead, the time period T and shaped-waveform are kept constant. The amplitude of DC voltage $V_c$, dipole voltage $V_d$, and the frequency of dipole frequency ω are simultaneously swept or scanned vs. the time. The frequency ω of dipole is scanned decreasingly while the time increases when α is larger than zero. The scanning of frequency ω, amplitude $V_c$ and $V_d$ can be linear or non-linear vs. the time. Because the resonance curve B is ion mass dependent, the electrostatic octopole voltage Vc should be scanned according to the mass weight so that the state B may be applied to different mass-to-charge ratios. The amplitudes $V_c$ of the electrostatic octopole voltage and $V_d$ of dipole voltage should be adjusted along with gas pressure inside the ion trap and mass-to-charge ratios to allow ion to resonant according to resonance curve of the frequency-amplitude curve B of the FIG. 2. During the scanning, the amplitude of oscillating ions having a specific a mass-to-charge ratio follows the curve B from s, J3 to J4 as shown in FIG. 2. The ions with a specific mass-to-charge ratio are sharply ejected out of the trap with the maximal or nearly maximal jumping distance J3-J4. It is also worth mentioning that the disclosed non-linear resonance is not dependent on any special $\beta_z$ lines of RF multipoles in stability diagram, it can be applied to any $\beta_z$ lines. The trapped ions with different mass-charge-ratios will be ejected one after the other through the hole on the disk 104 into the ion detector. There are a variety of choices for the ion detector, such as a Faraday cup, or a secondary electron multiplier with a conventional dynode, or a photomultiplier with conversion dynode, to name a few. FIG. 2 shows that the resonant jump of ions is dependent on the damping parameter $\gamma_z$ which is dependent on gas pressures in a vacuum chamber. By adjusting voltage $V_c$ or intensity of the electrostatic electric octopole field, ion resonance will follow the curve B, as shown in FIG. 2, for different gas pressures in the vacuum chamber. The disclosed ion trap can be operated with high performances, for example, with high mass-resolving power, in a lower vacuum chamber pumped by a low vacuum pump.

For the second method of the ion mass analysis, the frequencies Ω, ω of both RF voltage (for simplicity without losing generality, RF is cited but as stated above, a periodic voltage can also be utilized) and dipole voltage are kept at appropriate values but ω is lower than Ω/2, while the amplitudes V of RF voltage, $V_d$ of dipole voltage and $V_c$ of the electrostatic octopole voltage are simultaneously swept or scanned vs the time. V of RF voltage is scanned increasingly vs. the time when α is larger than zero. Typically, the amplitude of RF voltage is scanned linearly vs time although nonlinear scanning can also be done. As stated in the first method, the scanned amplitudes of the electrostatic octopole voltage $V_c$ and dipole voltage $V_d$ are adjusted along with gas pressure inside the ion trap and mass-to-charge ratios to allow ion to resonant according to frequency-amplitude curve B of the FIG. 2.

For the third method of the ion mass analysis, both $V_c$ and $V_d$ are static voltages; $V_d$ is grounded. The frequency Ω of the RF voltage is kept at a constant value while the amplitudes of RF voltage V and the electrostatic octopole voltage $V_c$ are simultaneously, synchronously swept or scanned vs the time. The amplitudes of RF voltage V is scanned increasingly vs the time. In this method, α must be larger than zero. Ions are ejected out of the trap When the related parameter $q_z$ approaches the boundary of the first stability region ($a_z$=0, $q_z$ smaller than or near to value 0.908). The electrostatic octopole field is used to improve the mass-resolving power and linearity of the mass assignment.

Figure 3:
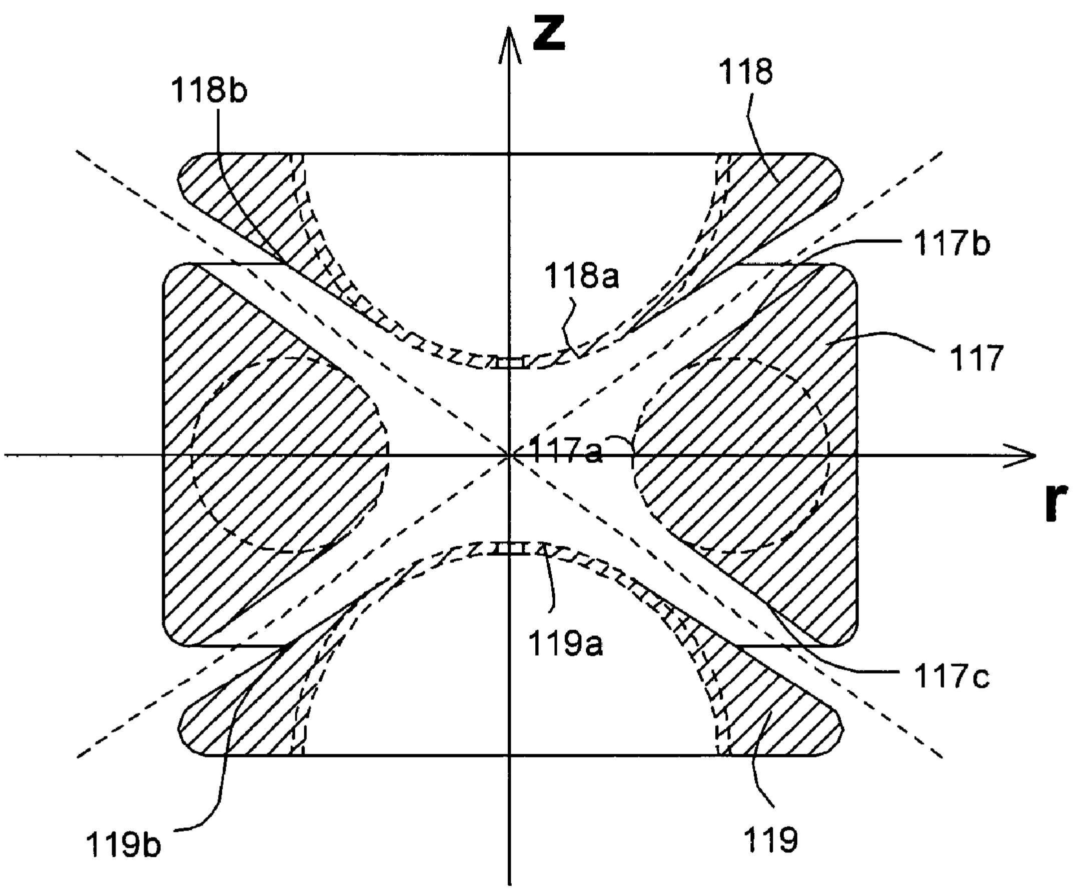
FIG. 3 is a cross-sectional view of an alternative electrode structure of a three-dimensional, rotationally symmetric ion trap in accordance with the invention.

An alternative electrode structure or embodiment of the ion trap is shown in FIG. 3. The idea is to use a set of surfaces to approximately approach the hyperbolic surfaces. More closely the hyperbolic surfaces can be approached, the better a quadrupole ion trap can be obtained. The surfaces of the two cap electrodes 118, 119, facing toward the inside of the ion tap, consist of a portion of spherical surface 118*a*, 119*a* and portion of cone surfaces 118*b*, 119*b*. The cross-sectional surfaces of the ring electrode 117 consist of a portion of circle 117*a* and two straight lines 117*b*, 117*c* jointed in orthogonal to the circle. The ring electrode is formed with rotating the curves 117*a*, 117*b* and 117*c* along the z-axis. The radius of the circles and the angles of the cone to the circles are optimized to approach a quadrupole with minimized multipoles. For instance, the radius of the circle is equal to the radius of the curvature of the hyperbolic surface in the apex and the straight line is chosen to approach the side curvature of the hyperbolic surface. The cap electrode can be cut into components same as in FIG. 1 to generate a main electrostatic octopole field.

Figure 4:
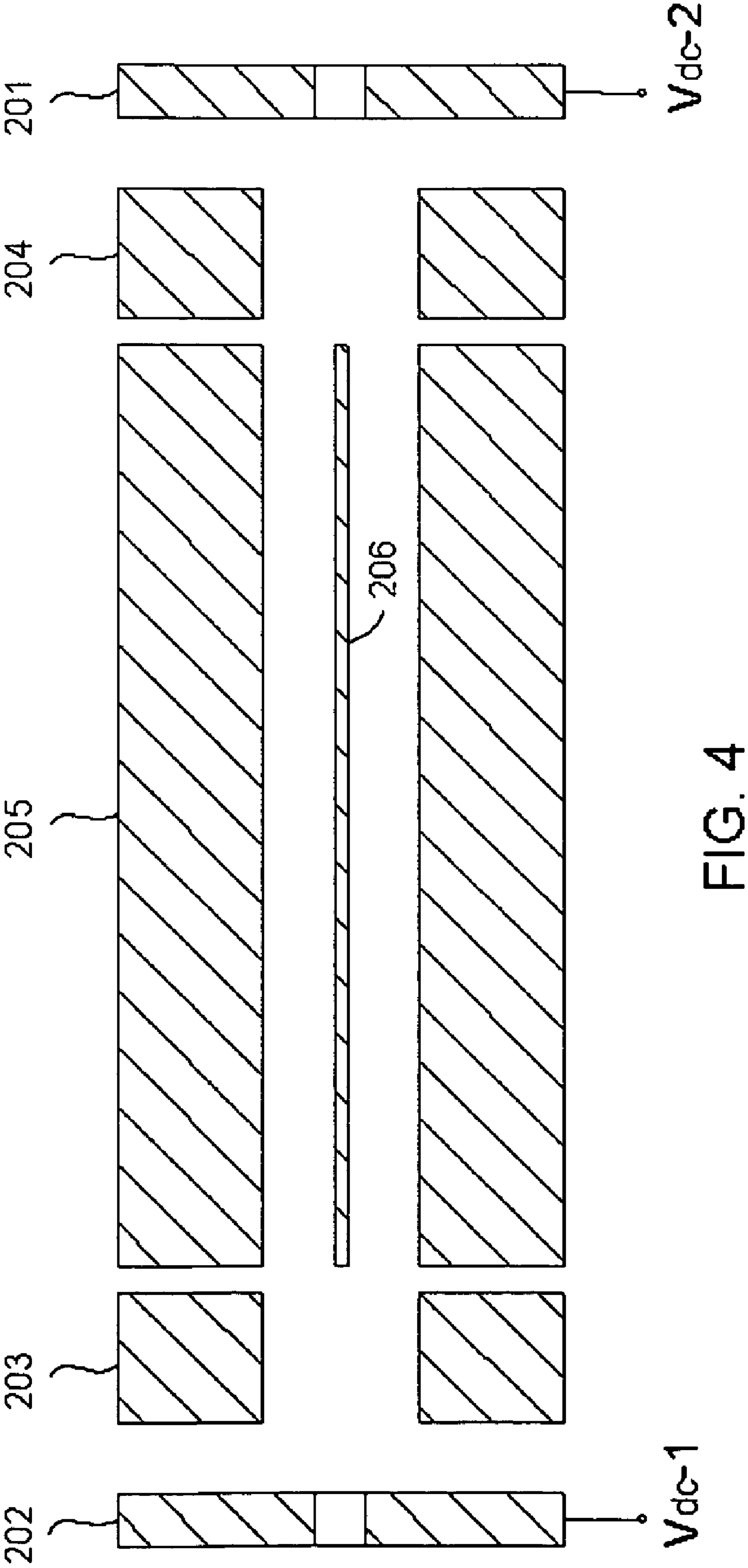
FIG. 4 is a schematic side view of a linear two-dimensional ion trap in accordance with the invention.
Figure 5:
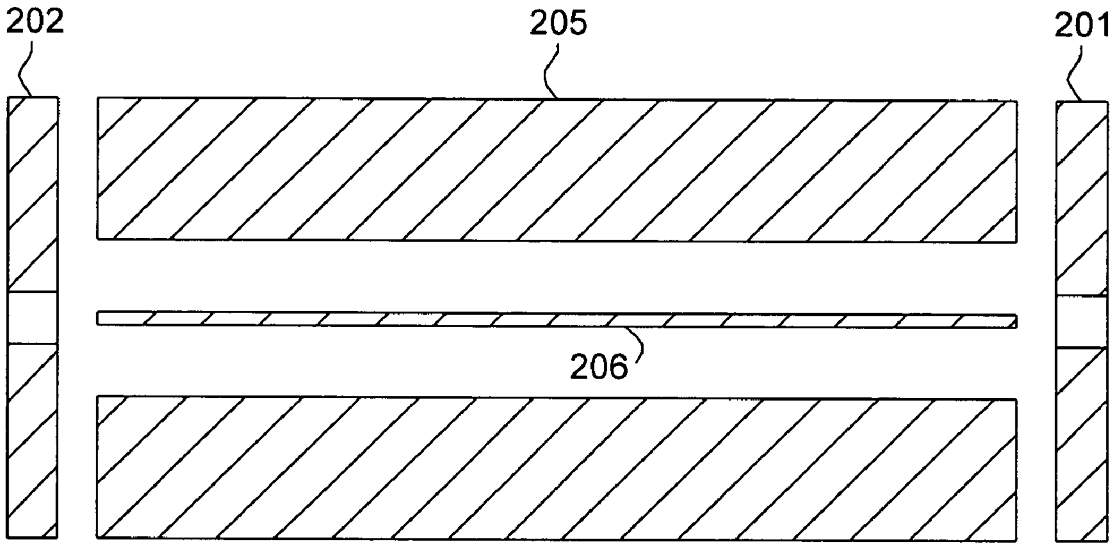
FIG. 5 is an alternative electrode structure analogue to FIG. 4 in accordance with the invention.
Figure 6:
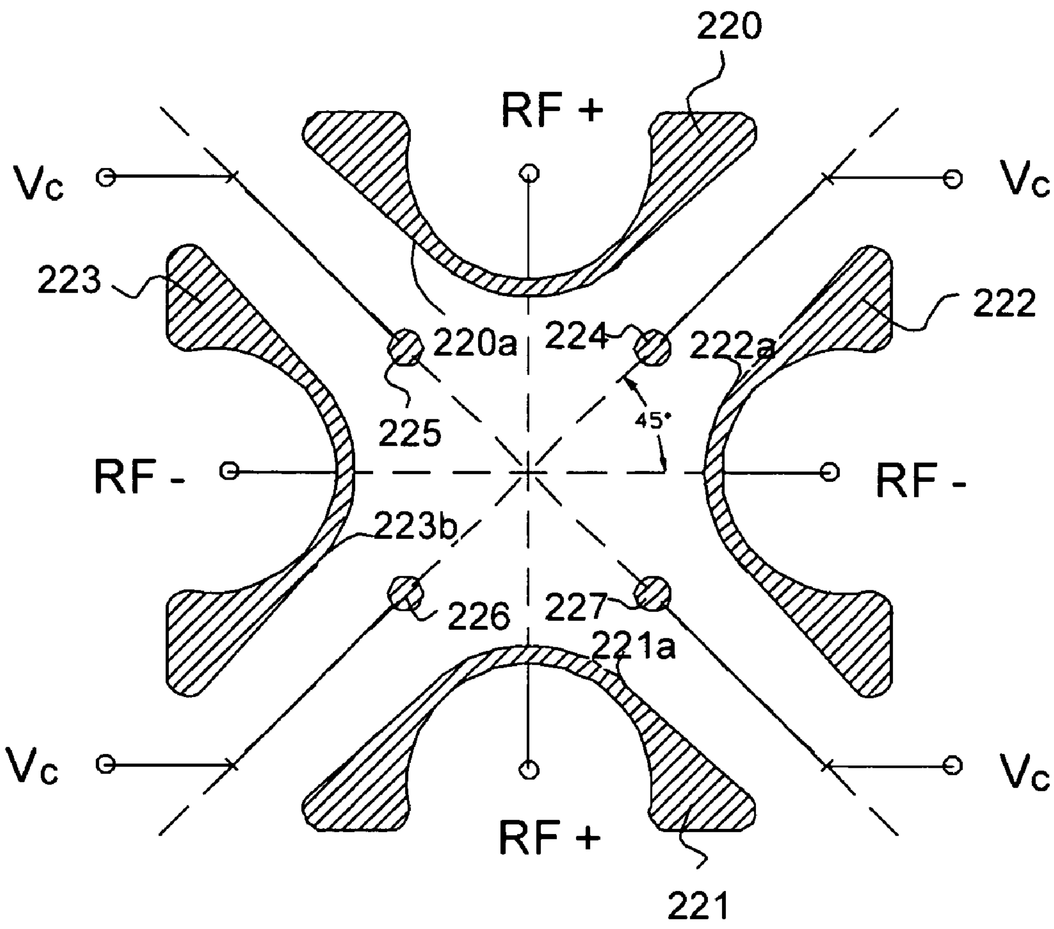
FIG. 6 is a cross-sectional view of the central electrodes of the linear two-dimensional ion trap in the FIG. 4 and FIG. 5 in accordance with the invention.
Figure 7:
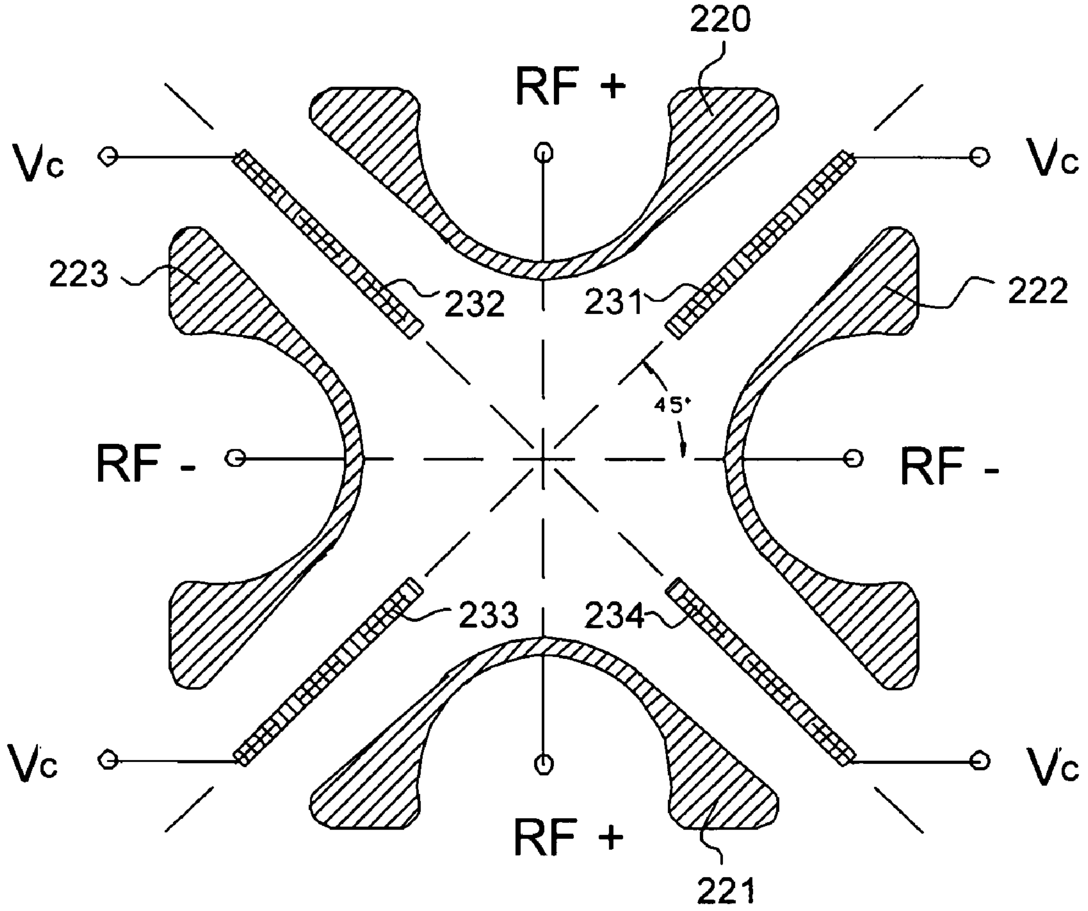
FIG. 7 is an alternative cross-sectional view of the central electrodes of the linear two-dimensional ion trap in the FIG. 4 and FIG. 5 in accordance with the invention.
Figure 8:
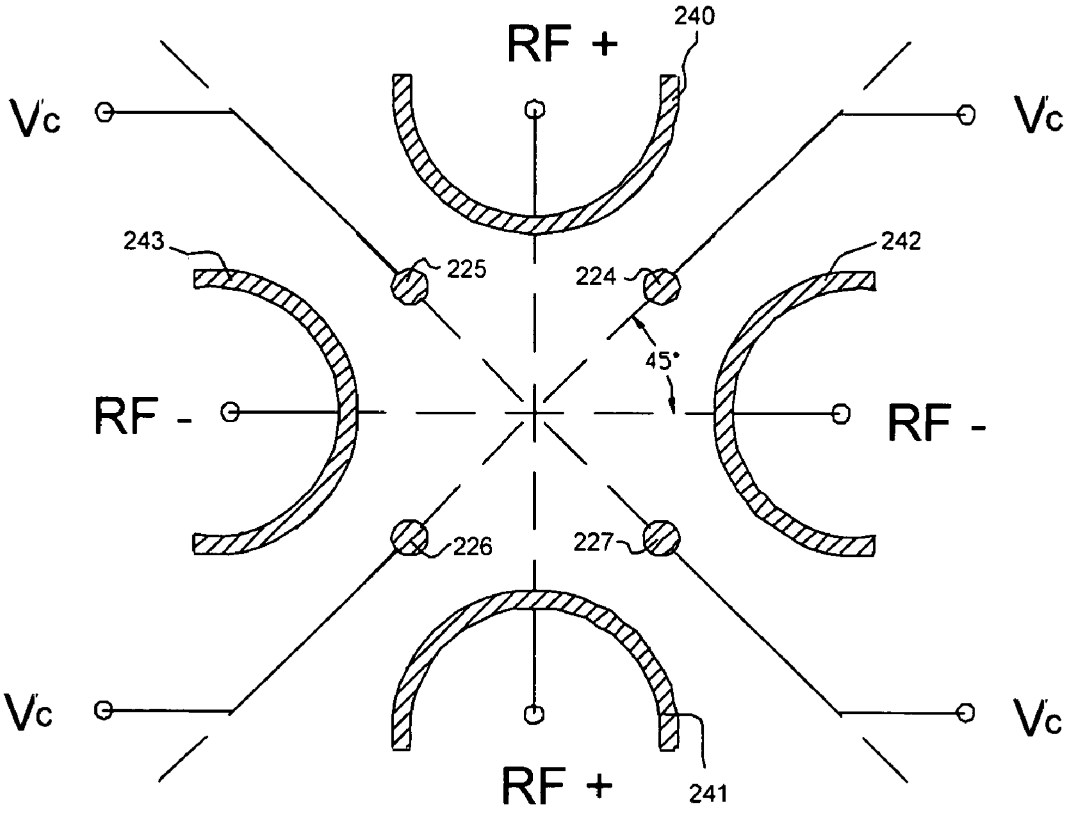
FIG. 8 is another alternative cross-sectional view of the central electrodes of the linear two-dimensional ion trap in the FIG. 4 and FIG. 5 in accordance with the invention.
Figure 9:
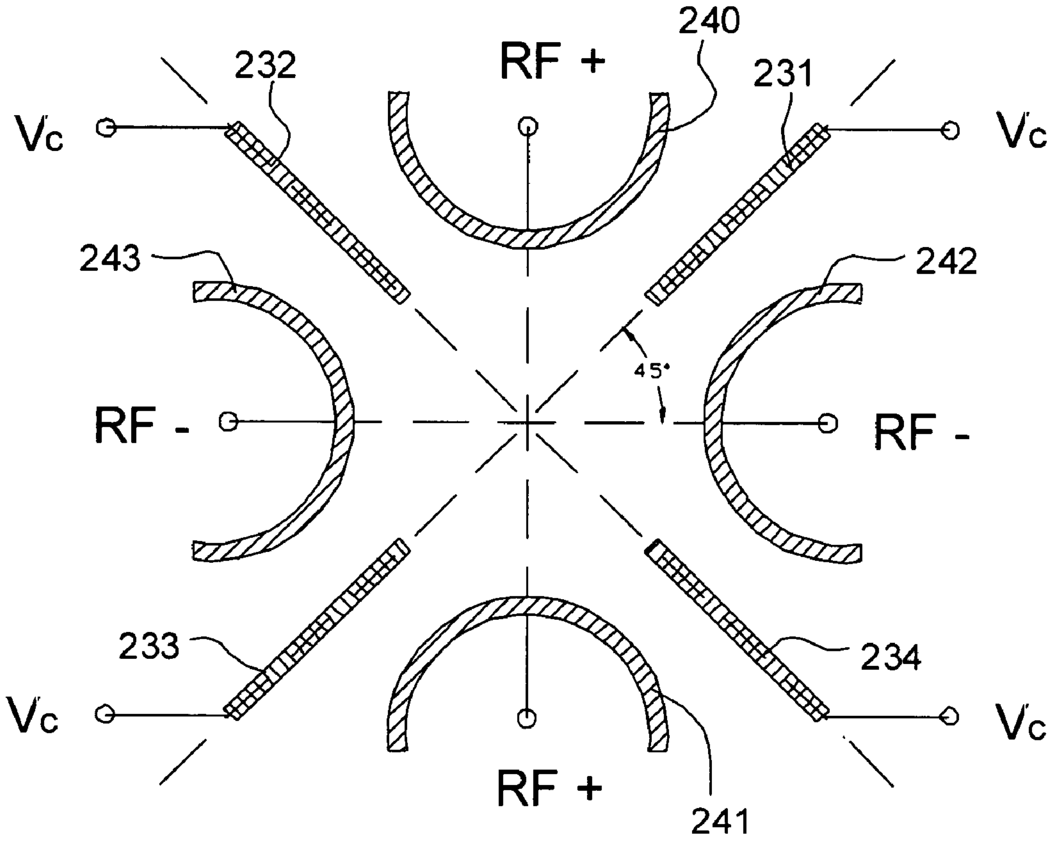
FIG. 9 is further another alternative cross-sectional view of the central electrodes of the linear two-dimensional ion trap in the FIG. 4 and FIG. 5 in accordance with the invention.

A two-dimensional linear ion trap can be designed in a similar fashion. FIG. 4 shows a structure with a side view; 201 and 202 are trapping plates, each having a central hole, 203 and 204 are typically a set of short quadrupole rods fields, 205 is a set of four quadrupole rods to generate two-dimensional quadrupole and 206 is a set of electrodes located between the quadrupole rods to generate main linear electrostatic octopole field. The DC voltages $V_{dc}$−1 and $V_{dc}$−2 are applied to 201 and 202 respectively, with positive voltages for positive ion mass and negative voltages for negative ion mass. A horizontal DC potential well will be formed in the linear ion trap. Ions are horizontally or axially trapped in the potential well. The RF voltage is applied to 203, 204 and 205. Another alternative linear ion trap is shown in FIG. 5. It consists of two trapping plate 201 and 202, a set of four quadrupole rods 205 to generate a main quadrupole field and a set of electrodes 206 to generate linear electrostatic octopole field. In contrast to FIG. 4, there are no short quadrupole rods between the trapping plate and center quadrupole rods The central portion of the linear ion trap, 205 and 206, in FIG. 4 and FIG. 5, can be designed having different geometry structures. FIG. 6 shows an example of the cross-sectional view of an electrode structure. 220, 221, 222 and 223 are identically shaped cylinder electrodes with either hyperbolic surfaces 220*a*, 221*a*, 222*a* and 223*a* all facing toward the inside of the ion trap analogue to FIG. 1 or cross-sectional circle and two lines jointed to the circle in orthogonal analogue to FIG. 3. The rods 224, 225, 225 and 227 are located between each two adjacent cylinder electrodes. FIG. 7 shows further another alternative structure. A set of slice electrodes 231, 232, 233 and 234 are located between each two rods, for example, 231 in between 220 and 221. The slice electrodes are used to generate a linear electrostatic octopole field. FIG. 8 shows an alternative electrode structure to FIG. 6. The cylinder electrodes 240, 241, 242 and 243 are used to generate two-dimensional, linear, basic quadrupole field inside. Similarly, FIG. 9 shows an alternative electrode structure to FIG. 7. The cylinder electrodes 240, 241, 242 and 243 are used to generate two-dimensional, linear, basic quadrupole field.

The three operating methods of ion mass analysis, mentioned in the three-dimensional ion trap, can also be applied to the two-dimensional ion trap embodiments analogously. Specifically, in two-dimensional ion trap, a DC voltage is applied to the trapping plates elements 201 and 202 in FIGS. 4 and 5. For example, positive voltage is applied to trap positive ion in axis direction. For simplicity, the scanning method in the structure shown in FIG. 6 is described, but it can be applied to the other structure show in FIGS. 7, 8 and 9. A RF voltage (i.e. RF+) is applied to one of the two quadrupole electrode pair elements 220 and 221, and an opposite-phase (i.e. RF−, with 180 degree phase difference) RF voltage is applied to the other electrode pair elements 222 and 223, shown in FIG. 6. A two-dimensional quadrupole field is generated within the space. An AC voltage is applied to one pair of the qudrupole rods, for example, elements 220 and 221. A main dipole filed is generated with the space. Another DC voltage is applied to the set of small rods 224, 225, 226 and 227. A two-dimensional electrically variable electrostatic octopole filed is generated within the space. By scanning RF, AC voltages and frequencies and scanning DC voltage on the set of small rods as mentioned above, the trapped ion mass will be ejected through a slit opening in one rod, for example, element 220, one after another. The ejected ion mass is thus detected and analyzed.

The ion traps superimposed with electrostatic octopole can be operated in lower vacuum of $10^{-2}$ to $10^{-1}$ mbar pumped by a low vacuum pump, such as, a rough pump. Based on the result shown in FIG. 2, independently adjusting the intensity of the electrostatic octopole according to the gas pressure in the vacuum chamber can optimize the mass resolving power. Although the resonance curve is broadened due to high gas pressure, the sharply jumping of ions can be realized by an appropriate intensity value of the electrostatic octopole, referring back to FIG. 2. The sharp jumping of ion at resonant results in the higher mass resolving power. This feature makes the ion tap in present invention to have a certain amount of electrically variable electrostatic octopole which differs from the prior art ion trap. Because of lower vacuum, it is possible to make a small portable ion trap mass spectrometer based on disclosed invention.

In order to efficiently transfer externally injected ions into the three-dimensional ion trap and to increase mass-analytical sensitivity, a novel electrode structure is disclosed. The three-dimensional ion trap can be switched electrically to a two-dimensional linear ion trap, and vice versa. FIG. 10 shows a cross-sectional view of an embodiment that the ring electrode 100 is equally cut in parallel to its central axis (i.e. z-axis) into four parts 304, 305, 306 and 307. FIG. 10*b* shows the top view of the ring structure. If the ion trap is operated as a three-dimensional ion trap, electrodes 304-307 are connected to either a RF voltage input or a periodic voltage input. Amplitudes of the RF voltages or periodic voltages U11, U12, U13 and U14 are identical. The operating method of analyzing ion mass has been introduced above. However, if the trap is operated as a two-dimensional linear ion trap, the electrodes 304 and 306 are connected together to a first identical RF input. The electrodes 305 and 307 are connected together to a second identical RF input. The values of the first and second input voltage are the same but with opposite polarities. By doing so, the two-dimensional multipoles with a main RF quadrupole field are generated inside the linear ion trap to trap ions in r direction.

The cap voltages V1 and V2 form a DC potential well to trap ions in z direction. Therefore, for trapping the externally injected ions, the ion trap is operated as a linear two-dimensional ion trap. To function as a mass analyzer, the ion trap can be electrically switched to a three-dimensional ion trap. Stability parameters can be adjusted to allow the ion to be trapped for both cases. FIG. 11 shows another alternative embodiment. The ring electrode 100 is equally cut in parallel to its central axis (i.e. z-axis) into six parts 310, 311, 312, 313, 314 and 315. FIG. 11*b* shows the top view of the ring electrode. If the ion trap is operated as a three-dimensional ion trap, electrodes 310-315 are connected to a RF voltage input or a periodic voltage input. The amplitudes of the RF voltages or periodic voltages U21, U22, U23, U24, U25 and U26 are identical. The operating method of analyzing ion mass has been introduced above. However, if the device is operated as a two-dimensional linear ion trap, the electrodes 310, 312 and 314 are connected together to a first identical input. The electrodes 311, 313 and 315 are connected together to a second. The values of the first and second input voltages are the same but with opposite polarities. By doing so, linear RF multipoles with a main linear RF hexapole field are generated inside the linear ion trap to trap ions in r direction. The cap voltages V1 and V2 form a DC potential well to trap ions in z direction. FIG. 12 shows another alternative embodiment. The ring electrode 100 is cut in parallel to its central axis (i.e. z-axis) into eight parts 320, 321, 322, 323, 324, 325, 326 and 327. FIG. 12*b* shows the top view of the ring structure. If the ion trap is operated as a three-dimensional ion trap, electrodes 331-338 are connected to a RF voltage input or a periodic voltage input. The amplitudes of the RF voltages or periodic voltages U31-U38 are identical. The operating method of analyzing ion mass has been introduced above. However, if the trap is operated as a two-dimensional linear ion trap, the electrodes 320, 322, 324 and 326 are connected together to a first identical input. The electrodes 321, 323, 325 and 327 are connected together to a second identical input. The values of the first and second identical input voltages are the same but with opposite polarities. By doing so, two-dimensional multipoles with a main RF octopole field are generated inside the linear ion trap to trap ions in r direction. The cap voltages V1 and V2 form a DC potential well to trap ions in z direction. Although equal and symmetric cuts are shown in FIGS. 10-12, it should be noted that unequal and/or non-symmetrical cut can also be done in a similar fashion.

An exemplary embodiment showing switching from three-dimensional ion trap to two-dimensional linear ion trap, and vice versa, is shown as electrical schematic diagram in FIG. 13. When the switcher S is switched to RF voltage RF+, the ion trap is operated as a three-dimensional ion trap, when the switcher S is switched to RF voltage RF−, the ion trap is operated as a two-dimensional linear ion trap. The RF+ and RF− have the identical value but different polarity. In FIG. 13, the quadrupole ion trap is chosen only for illustration purpose. It is worth emphasizing that it should not be limited to quadrupole ion trap, the same principle can also be applied to other types of ion traps such as hexapole or octopole ion trap as shown in FIG. 11 and FIG. 12. FIG. 13 shows a concept diagram to electronically realize the combined three and two-dimensional ion trap. Many practical electric methods can be used. For example, if the trap is operated in two-dimensional mode, splitting one RF frequency source to two identical lines. One line is power-amplified to appropriate voltage RF+; while the another line first phase-shifted with 180 degree and then power-amplified to voltage RF−. Voltages RF+ and RF− are applied to the corresponding ring-electrode's elements.

Therefore, a two-dimensional ion trap is formed. If used as a three-dimensional ion trap, no phase shift is electrically applied, and then two identical RF voltages are applied to ring electrode's elements, to list a few of many possible implementations.

Figure 14:
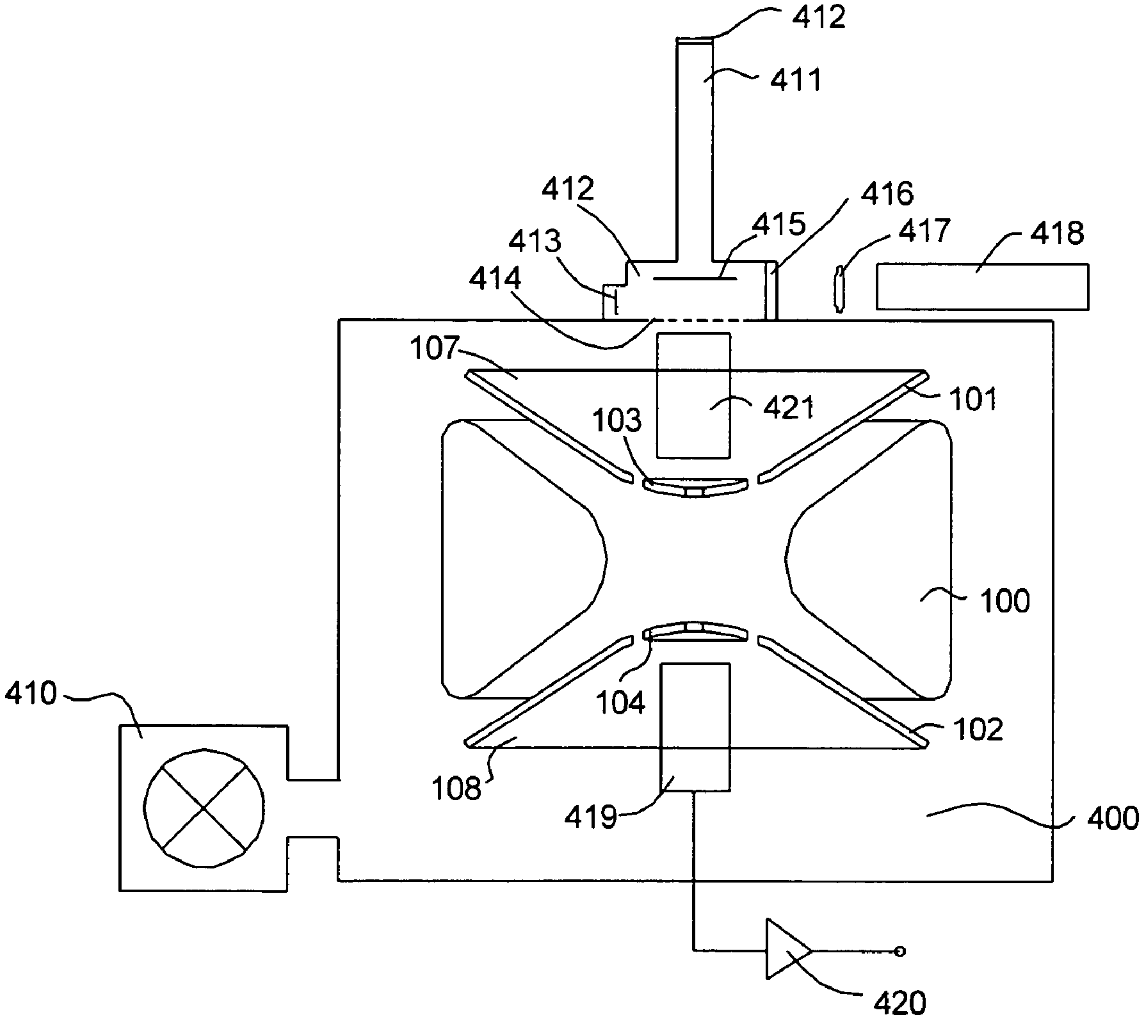
FIG. 14 is an application embodiment of the ion trap in accordance with the invention.

FIG. 14 shows an application embodiment of the disclosed ion trap in accordance with the present invention. The ion tap is sealed in a vacuum chamber 400 which is pumped by a lower vacuum pump 410, such as a rough vacuum pump or a diaphragm vacuum pump. Gas-phase sampling molecules go through a membrane 412 and a gas-inlet tube 411 to flow into an ionization area 412. The membrane is used as an entrance for gas-phase molecules and to keep vacuum in the chamber. The molecules are ionized by radioactive $^{63}$Ni beta source 413 or multi-photon ionization of laser 418. The laser beam is focused by lens 417 and goes through a gas-sealed quartz window 416 to project into the ionization area 412. The generated molecular ions are electrically gated by a pulse via a plate electrode 415 (positive voltage for positive ions and negative voltage for negative ions), which go through a metallic mesh 414 and are focused by an ion optical lens system 421 into the ion trap. Metallic meshes can be used to replace the disk electrodes 103 and 104. Ion detector 419 can be a Faraday cup or photomultiplier with a conversion dynode and a phosphorus screen or a scintillate. The photomultiplier can also be located outside the vacuum chamber and be used to detect signal photos through a gas-sealed quartz window. The signal is amplified by a pre-amplifier 421 and can be measured accordingly.

Figure 15:
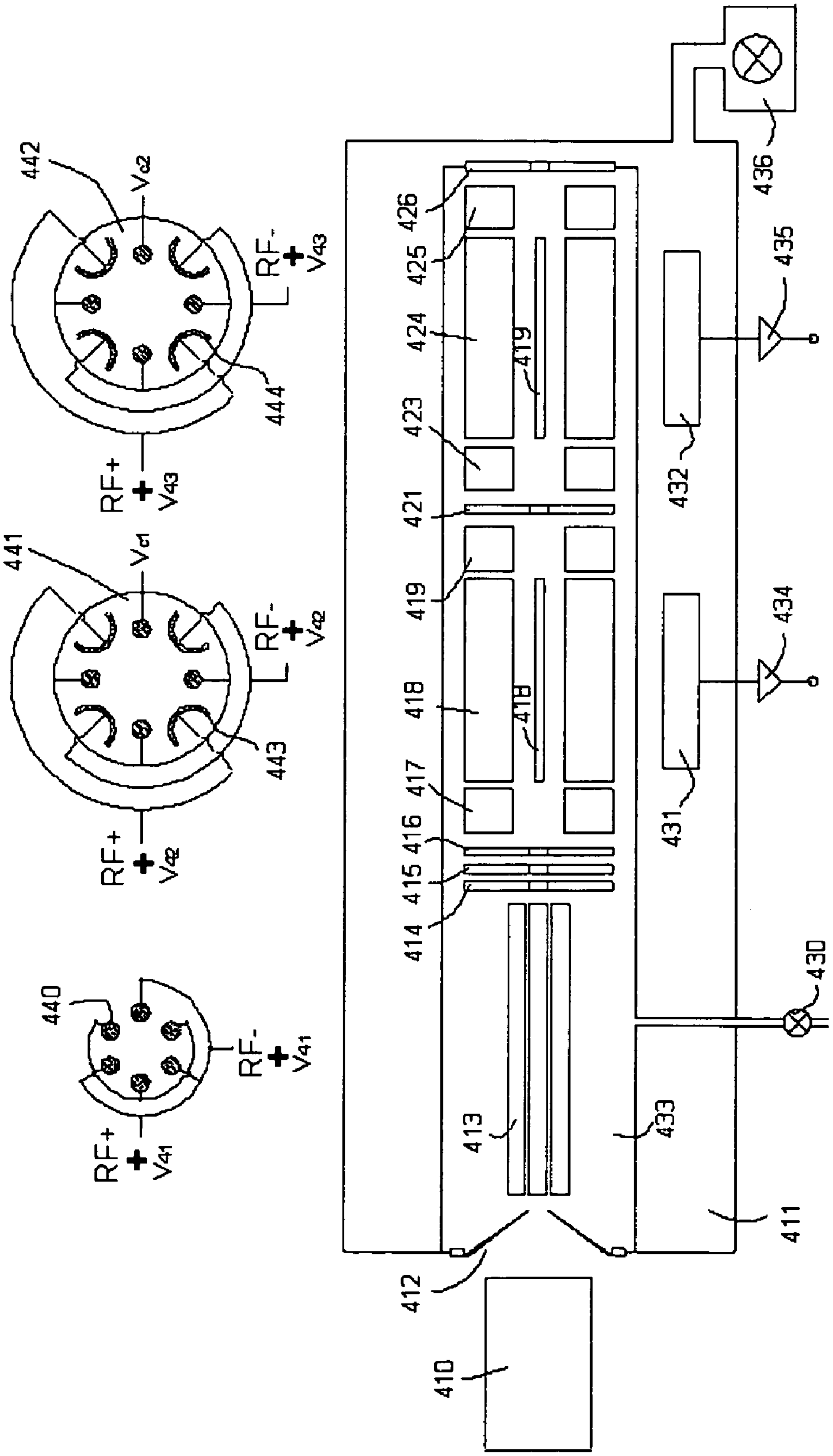
FIG. 15 is another application embodiment of the two-dimensional linear ion trap in accordance with the invention.

FIG. 15 shows another application embodiment of the disclosed two-dimensional ion trap in accordance with the present invention. Two linear ion traps used not only as a mass analyzer, but also a tandem mass spectrometry instrument to perform multiple MS/MS experiments coordinately. The instrument set up is shown in a side view in FIG. 15. It consists of an ionization source 410, such as electrospray ionization (ESI), or a Matrix-Assisted Laser Desorption Ionization (MALDI); a skimmer lens electrode 412; a linear hexapole ion guide 413 with a cross-section of a set of six rod-electrodes 440; a set of lens electrodes 414, 415 and 416; and two linear ion trap as described in FIG. 4 and FIG. 8 with the cross-section 441 and 442. The linear ion trap used in the instrument is not only a mass analyzer, but also a collision cell. The central portion of each linear ion trap can be replaced by the disclosed structures in FIG. 6, or in FIG. 7 and or in FIG. 9. The lens electrode 421 joins two linear ion traps together in series. Items 431 and 432 are ion detectors, such as secondary electron multipliers with conversion dynode and items 434 and 435 are ion-signal pre-amplifier. Each ion detector detects the mass ion ejected through a slot opening on the quadrupole rod 443 and 444 in the center section of the linear ion trap. The hexapole, lens electrode system and two linear ion trap are enclosed in a chamber 433, which is filled with gas, such as Helium (He) or Nitrogen ($N_2$) or Argon (Ar), which is flow in through a gas valve 430 and pumped by vacuum system 436 through the hole in the center of the lens electrode 426 and the slot opening on the rods 443, 444. The chamber 433 and two detectors 431 and 432 are placed in a vacuum chamber 411, which is pumped by the vacuum pump system 436. In one mass detecting cycle, ions generated by ionization source 410, are first accumulated or trapped in the linear hexapole ion guide 413, which is used as a linear ion trap. In vertical cross-section 440, ions are trapped by RF hexapole field while in horizontal, ions are trapped by a potential well formed by voltage of the lens electrode 412, offset voltage $V_{41}$ of ion guide 413 and voltage of the lens electrode 414. The voltage of the lens electrode 414 is higher to block or reflect the injected ions. The ions will be cooled dawn in the hexapole and damped to the center by the gas. For positive ions, the offset voltage $V_{41}$ of ion guide 413 is lower than voltages of the lens electrodes 412, 414 and forms a potential bottom of the potential well. The ions have the potential energy $eV_{41}$ after the cooling. After the desired accumulation time, the ions are released by pulsing the voltage of the lens electrode 414 down to the value which is lower than the offset voltage $V_{41}$. Once the hexpole ion guide is empty, the accumulation of ions in the hexapole trap is repeated. The released ions will be extracted and focused by lens electrode system 414, 415 and 416 into the linear ion trap 418. In the similar way, the ions are blocked or reflected by the potential wall generated by voltages of the short quadrupole 419 and lens electrode 421. After ions go into 418, the voltage 416 and offset voltage 417 are returned back to higher potential than $V_{41}$. The ions are trapped in the two-dimensional ion trap by RF quadrupole field in vertical cross-section and by the potential well in horizontal. The potential well is formed by voltage of lens electrodes 416, 421, offset voltage of short quadrpoles 417 and 419, and offset voltage $V_{42}$ of the center quadrupole 418. For measuring molecular weight only, the mass scanning method descried above is used in the same manner. The ejected ions with a specific mass-to-charge ratio are detected by the ion detector 431. The mass spectrum is obtained by measuring ions with different mass-to-charge ratios one after the other. If MS/MS experiments are performed, the experiment will proceed further without measuring. The MS/MS experiment is performed in a so-called collision cell to measure fragment or daughter ions by dissociating parent ions. The collision cell is gas-tightly sealed and filled so-called collision gas, such as He or $N_2$ and or Ar. There is magnitudes pressure difference between insider and outside of the cell. In the instrument, the gas pressure in the chamber or cell 433 is about a few $10^{-3}$ mbar, while in the chamber 433 is maintained at $10^{-5}$ mbar or lower. The parent ions, which flow in the cell, have axial kinetic energies. Energetic ions are caused to collide with the collision gas in the chamber. The kinetic energy of the ions, in part, is converted to internal energy which results in ion fragmentation. The phenomenon is so-called collision-induced dissociation (CID). The product ions after the fragmentation are called the fragment ions or daughter ions. The M/MS experiment is performed to measure the fragment ion masses. With MS/MS experiments, the molecular structure information can be obtained. The collision of the ions with gas in the collision cell also has the effect of cooling the ions. The MS/MS experiment is performed in the instrument in the following way. Ion having a mass of interest (i.e. parent ions) is first isolated or mass-selected in the linear ion trap 418. The mass-selection means that only the ions with a certain range of mass-to-charge ratios are trapped while other ions are eliminated in the trap. The mass-selection can be done in the linear ion trap by the way the same as a mass filter. The higher and lower masses than masses of the certain range of mass-to-charge ratios can be eliminated by the boundaries of the first stability region of the stability diagram of quadrupole field. By releasing voltage pulses for the short quadrupole 419, 423 and the lens 421, the mass-selected ions enter the secondary linear ion trap 424, which is used as a collision cell at first, with a kinetic energy defined by the potential difference between the first linear ion tap 418 and the secondary ion trap or $e(V_{42}-V_{43})$. Collisions between the ions and collision gas, for example $N_2$, in the linear ion trap 418 are used to fragment the ions.

Figure 16:
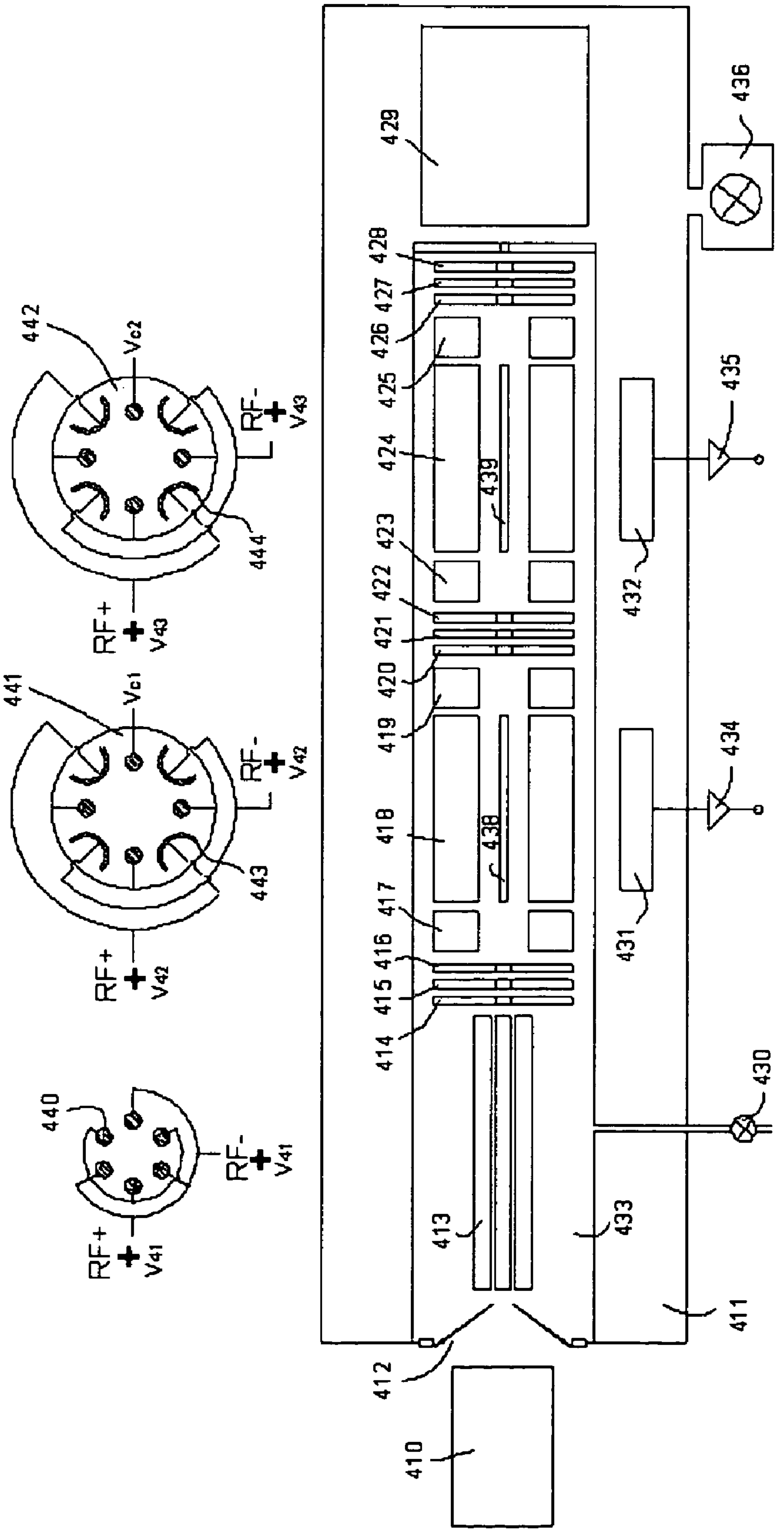
FIG. 16 is an alternative embodiment of the two-dimensional linear ion trap in accordance with the invention.

Eventually, these collisions will also cool the ions such that they are trapped in the linear ion trap 424. After the desired trapping time, the fragment and remaining parent ions are analyzed in the secondary linear ion trap 424 by the scanning method described above. Furthermore, multiply MS/MS experiments can be performed in the instrument according to the invention. A daughter ion having a mass of interest can be mass-selected further in the same way in the secondary linear ion trap 424. By releasing voltage pulses for the short quadrupole 419, 423 and the lens electrode 421, the selected daughter ions enter the first linear ion trap 418, which is used as a collision cell at first, with a kinetic energy defined by the potential difference between the secondary linear ion tap 418 and the first ion trap or $e(V_{43}-V_{42})$. The fragmentation and mass analysis processes as same as that described above are performed in the first linear ion trap 418. The granddaughter ion mass spectrum can be obtained. The higher MS/MS or multiply MS/MS experiments can be performed by using two linear ion traps in repeating. The multiply MS/MS experiments can also be performed by one ion detector only, for example, 431. The mass-selected is performed in the first linear ion trap 418; the parent ions are fragmented in the secondary ion trap 424 but transferred back to the first linear ion trap 418 and measured in the first linear ion trap 418. The process is repeated to perform multiply MS/MS experiments. Also, the multiply MS/MS experiments can be performed between the hexapole ion guide 413 and the first linear ion trap 418 in the same way. The mass-selection and mass analysis are performed in the first linear ion trap and ion fragmentation is performed in the hexapole. In the FIG. 16, the lens electrode 421 can be replaced by a set of lens electrode system such as 414, 415 and 416. The short quadrupole 417, 419, 423 and 425 can also be eliminated so that the two-dimensional linear ion trap shown in FIG. 5 is applied. Also, the short quadrupole 419, 423 and lens electrode 421 can be replaced by a short quadrupole, such as 419, only; or a set of lens system like 414, 415 and 416 between two central sections 418 and 424. Another alternative is shown in FIG. 16. The fragment ions are analyzed by a time-of-flight (TOF) mass analyzer 429. After ion fragmentation, the fragment ions are released by a voltage pulse applied on the lens electrode 426. The released ions are focused and collimated by the lens electrode system 426, 427 and 428 and enter into TOF mass analyzer 429. All replacements for two linear ion traps mentioned above in the FIG. 15 can be applied. Moreover, the mass analysis with the linear ion trap 418 or 424 also can be done without the electrostatic octopole field or without a set of four rods which generate the octopole field.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the invention is reserved.

What is claimed is:

1. A two-dimensional ion trap comprising:

a first and second trapping plate located in a first and second terminals of the ion trap device;

a set of four quadrupole rods located in the center;

a set of electrodes located between the set of four quadrupole rods;

a control circuitry for applying a predetermined voltage to said first and second trapping plates;

a RF circuitry constructed and arranged for applying a RF voltage to said set of four quadrupole rods to generate a main two dimensional quadrupole field;

an AC offset circuitry constructed and arranged for applying an AC voltage to a pair of said set of four quadrupole rods to generate a main dipole field;

a DC circuitry constructed and arranged for applying a DC voltage to said set of electrodes to superimposes a two dimensional electrically variable electrodes octopole field within said two dimensional quadrupole field.

2. An ion trap system, comprising:

an ion trap of claim 1, wherein the ion trap being sealed within a vacuum chamber pumped by a vacuum pump to provide gas pressure in the ion trap.

3. The ion trap system of claim 2 wherein said vacuum chamber having vacuum in the range between $10^{-2}$ to $10^{-1}$ mbar.

4. The ion trap system of claim 2 wherein the DC circuitry being constructed and arranged for applying an DC voltage to adjust the intensity of the electrically variable DC octopole field in the ion trap to optimize the mass resolving power.

5. A method for providing ions into ion trap system of claim 2, comprising:

introducing gas-phase molecules through a membrane into an ionization area;

ionizing said gas-phase molecules by a radioactive Ni beta source or multi-photon ionization of laser.

6. A two-dimensional ion trap comprising:

a first and second trapping plate located in a first and second terminals of the ion trap device;

a set of four quadrupole rods located in the center;

a set of electrodes located between the set of four quadrupole rods;

a control circuitry for applying a predetermined voltage to said first and second trapping plates;

a RF circuitry constructed and arranged for applying a RF voltage to said set of four quadrupole rods to generate a main two dimensional quadrupole field;

an AC offset circuitry constructed and arranged for applying an AC voltage to a pair of said set of four quadrupole rods to generate a main dipole field;

a DC circuitry constructed and arranged for applying a DC voltage to said set of electrodes to superimposes a two dimensional electrically variable electrodes octopole field within said two dimensional quadrupole field;

wherein keeping amplitude and frequency of the RF voltage or amplitude and period of the periodic voltage at predetermined values;

simultaneously sweeping or scanning the amplitude of the DC voltage and the amplitude and frequency of the AC voltage vs. time to eject ion mass from the ion trap one after another.

7. A two-dimensional ion trap comprising:

a first and second trapping plate located in a first and second terminals of the ion trap device;

a set of four quadrupole rods located in the center;

a set of electrodes located between the set of four quadrupole rods;

a control circuitry for applying a predetermined voltage to said first and second trapping plates;

a RF circuitry constructed and arranged for applying a RF voltage to said set of four quadrupole rods to generate a main two dimensional quadrupole field;

an AC offset circuitry constructed and arranged for applying an AC voltage to a pair of said set of four quadrupole rods to generate a main dipole field;

a DC circuitry constructed and arranged for applying a DC voltage to said set of electrodes to superimposes a two dimensional electrically variable electrodes octopole field within said two dimensional quadrupole field;

wherein keeping frequency of the RF voltage or the period of the periodic voltage and the frequency of the AC voltage at predetermined values;

simultaneously sweeping or scanning the amplitudes of the RF voltage or the periodic voltage, the AC voltage and the DC voltage vs the time to eject ion mass from the trap one after another.

8. A two-dimensional ion trap comprising:

a first and second trapping plate located in a first and second terminals of the ion trap device;

a set of four quadrupole rods located in the center;

a set of electrodes located between the set of four quadrupole rods;

a control circuitry for applying a predetermined voltage to said first and second trapping plates;

a RF circuitry constructed and arranged for applying a RF voltage to said set of four quadrupole rods to generate a main two dimensional quadrupole field;

an AC offset circuitry constructed and arranged for applying an AC voltage to a pair of said set of four quadrupole rods to generate a main dipole field;

a DC circuitry constructed and arranged for applying a DC voltage to said set of electrodes to superimposes a two dimensional electrically variable electrodes octopole field within said two dimensional quadrupole field;

wherein setting the frequency of the AC voltage to zero;

setting the amplitude of the AC voltage to be different from the amplitude of the DC voltage or zero;

keeping the frequency of the RF voltage or the period of the periodic voltage at predetermined value;

simultaneously sweeping or scanning the amplitudes of the RF voltage and DC voltage vs. time to eject ion mass from the trap one after another.

* * * * *